US011326035B2

(12) United States Patent
Takamori et al.

(10) Patent No.: US 11,326,035 B2
(45) Date of Patent: May 10, 2022

(54) METHOD FOR SELECTIVELY BINDING TARGET MOLECULE TO POLYMER MOLDED BODY AND METHOD FOR PRODUCING TARGET MOLECULE-BOUND POLYMER MOLDED BODY USING THE SAME

(71) Applicants: EARTH CORPORATION, Tokyo (JP); OSAKA UNIVERSITY, Suita (JP)

(72) Inventors: Kiyoto Takamori, Tokyo (JP); Kei Ohkubo, Osaka (JP); Haruyasu Asahara, Osaka (JP); Tsuyoshi Inoue, Osaka (JP)

(73) Assignees: Earth Corporation, Tokyo (JP); Osaka University, Osaka (JP)

( * ) Notice: Subject to any disclaimer, the term of this patent is extended or adjusted under 35 U.S.C. 154(b) by 0 days.

(21) Appl. No.: 16/967,333

(22) PCT Filed: Feb. 5, 2019

(86) PCT No.: PCT/JP2019/004063
§ 371 (c)(1),
(2) Date: Aug. 4, 2020

(87) PCT Pub. No.: WO2019/151535
PCT Pub. Date: Aug. 8, 2019

(65) Prior Publication Data
US 2021/0032428 A1 Feb. 4, 2021

(30) Foreign Application Priority Data

Feb. 5, 2018 (JP) .............................. JP2018-018598

(51) Int. Cl.
*C08J 7/18* (2006.01)
*C08J 7/12* (2006.01)
(52) U.S. Cl.
CPC ................ *C08J 7/18* (2013.01); *C08J 7/123* (2013.01); *C08J 2323/30* (2013.01)
(58) Field of Classification Search
CPC ....... C08J 7/00; C08J 7/123; C08J 7/18; C08J 2323/30
See application file for complete search history.

(56) References Cited

U.S. PATENT DOCUMENTS

| 5,470,617 | A | * | 11/1995 | Nishii | ......................... | C08J 7/12 |
|           |   |   |         |        |                          | 427/521   |
| 5,582,955 | A | * | 12/1996 | Keana  | ......................... | C08F 8/30 |
|           |   |   |         |        |                          | 430/296   |
| 5,635,257 | A | * | 6/1997  | Nishii | ......................... | C08J 9/36 |
|           |   |   |         |        |                          | 427/554   |
| 5,859,086 | A | * | 1/1999  | Freund | ..................... | B29C 59/16 |
|           |   |   |         |        |                          | 522/83    |
| 6,007,876 | A | * | 12/1999 | Niino  | ...................... | A61L 27/34 |
|           |   |   |         |        |                          | 427/508   |
| 6,117,497 | A |   | 9/2000  | Murahara et al. | | |
| 8,529,681 | B1| * | 9/2013  | Hibbs  | .................. | C09D 5/1637 |
|           |   |   |         |        |                          | 106/18.21 |
| 9,745,428 | B2| * | 8/2017  | Iwashita | ............. | C23C 18/1608 |
| 2015/0044425 | A1 | * | 2/2015 | Iwashita | ............... | C23C 18/204 |
|           |   |   |         |        |                          | 428/172   |
| 2017/0037176 | A1 | * | 2/2017 | Minagawa | ............... | A61L 31/10 |
| 2017/0282469 | A1 |   | 10/2017 | Yamamura et al. | | |
| 2017/0320990 | A1 | * | 11/2017 | Minagawa | ......... | C09D 151/003 |
| 2017/0338080 | A1 | * | 11/2017 | Saleh  | ................ | H01J 37/32733 |
| 2019/0315936 | A1 |   | 10/2019 | Takamori et al. | | |

FOREIGN PATENT DOCUMENTS

| EP | 1 757 647 | 2/2007 |
|----|-----------|--------|
| EP | 3 190 148 | 7/2017 |
| EP | 3 398 925 | 11/2018 |
| JP | 6-340759  | 12/1994 |
| JP | 2000-053787 | 2/2000 |
| JP | 2000-109584 | 4/2000 |
| JP | 2005-253305 | 9/2005 |
| JP | 2010-216964 | 9/2010 |
| WO | 89/010208 | 11/1989 |
| WO | 2005/082429 | 9/2005 |

(Continued)

OTHER PUBLICATIONS

Nicolau et al. Protein patterning via radiation-assisted surface functionalization of conventional microlithographic materials, Colloids and Surfaces A: Physicochemical and Engineering Aspects. Volume 155, Issue 1, 1999, pp. 51-62 (Year: 1999).*
Burillo et al. Primary-amine surface functionalization of polytetrafluoroethylene films by radiation grafting of aminated polyacryloyl chloride. Radiation Physics and Chemistry. vol. 149, p. 65-72 (Year: 2018).*
Hetemi et al. Surface Functionalisation of Polymers. Chemical Society Reviews. (2017), 46, pp. 5701-5713. (Year: 2017).*
Chu et al. Surface functionalization of biomaterials by radical polymerization, Progress in Materials Science, vol. 83, pp. 191-235 (Year: 2016).*

(Continued)

*Primary Examiner* — Sanza L. McClendon
(74) *Attorney, Agent, or Firm* — Hamre, Schumann, Mueller & Larson, P.C.

(57) ABSTRACT

The present invention provides a new method for modifying a polymer molded body and binding a target molecule. The method for selectively binding a target molecule to a polymer molded body of the present invention includes: a pretreatment step of irradiating a selected surface of a polymer molded body with light in the presence of a compound radical; and a binding step of reacting a target molecule with the polymer molded body after the pretreatments to bind the target molecule to the selected surface of the polymer molded body, wherein the compound radical is a radical containing one element selected from the group consisting of Group 15 elements and Group 16 elements, and a Group 17 element.

11 Claims, 16 Drawing Sheets

(56) References Cited

FOREIGN PATENT DOCUMENTS

| | | |
|---|---|---|
| WO | 2017/104798 | 6/2017 |
| WO | 2018/110710 | 6/2018 |

OTHER PUBLICATIONS

International Search Report issued in International Application No. PCT/JP2019/004063, dated May 14, 2019, 4 pages.
Extended European Search Report of the corresponding European Patent Application No. 19748324.1 dated Aug. 13, 2021, 7 pages.
M. M. M. Bilek et al., "Free radical functionalization of surfaces to prevent adverse responses to biomedical devices", Proceedings of the National Academy of Sciences, vol. 108, No. 35, Aug. 30, 2011 (Aug. 30, 2011), pp. 14405-14410.

* cited by examiner

Before light irradiation

After light irradiation

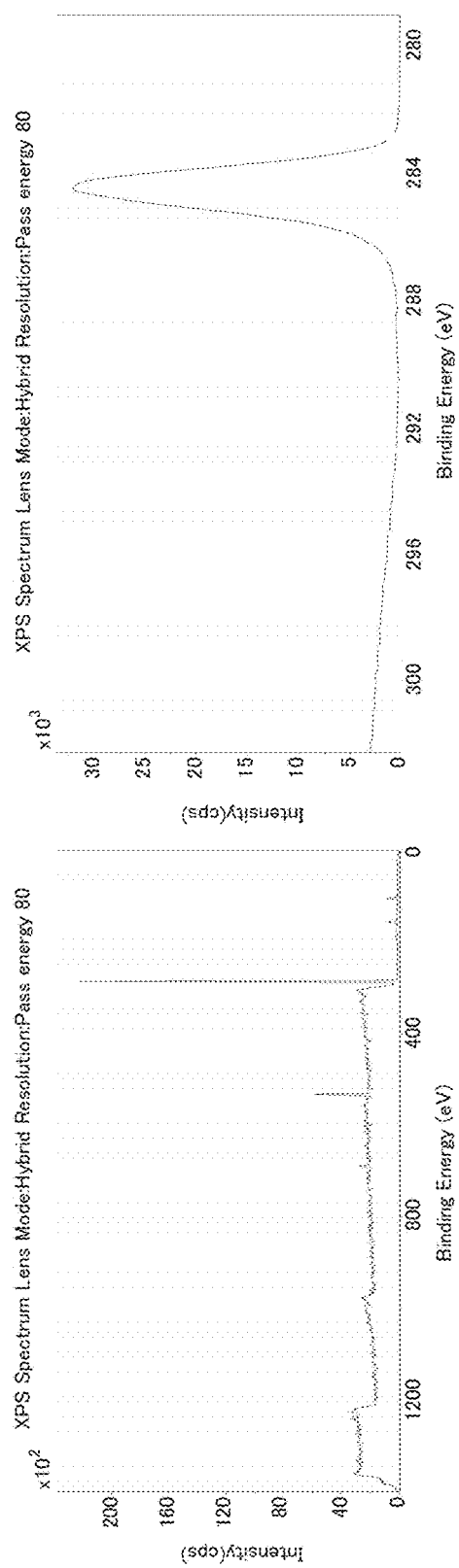
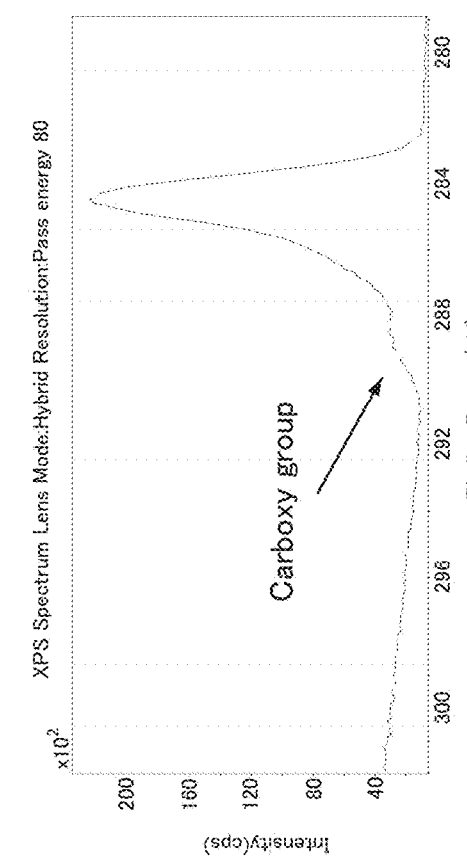
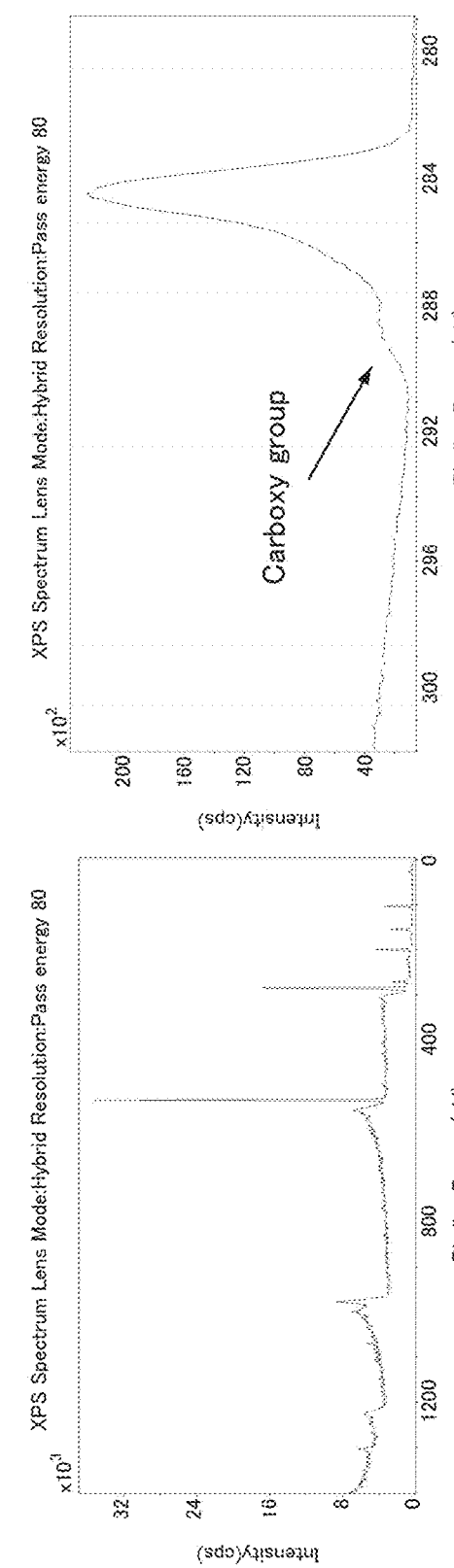
FIG. 8A1  FIG. 8A2  FIG. 8B1  FIG. 8B2

Before light irradiation

After light irradiation

Before light irradiation

After light irradiation

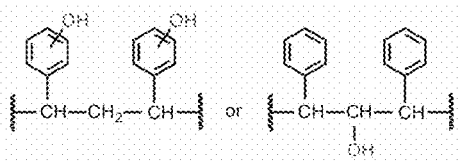
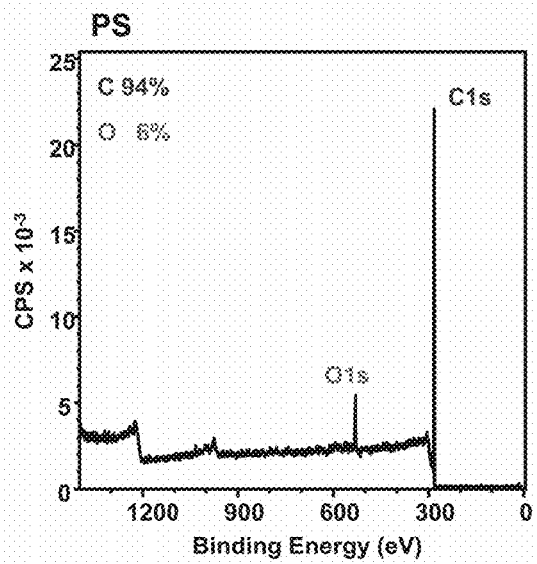
FIG. 21A1
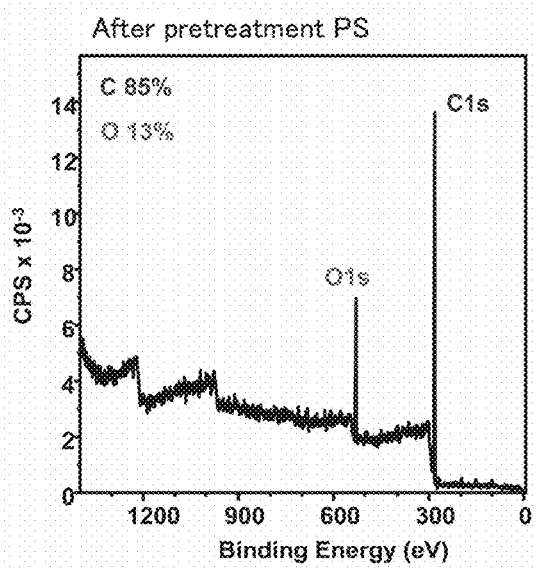
FIG. 21A2
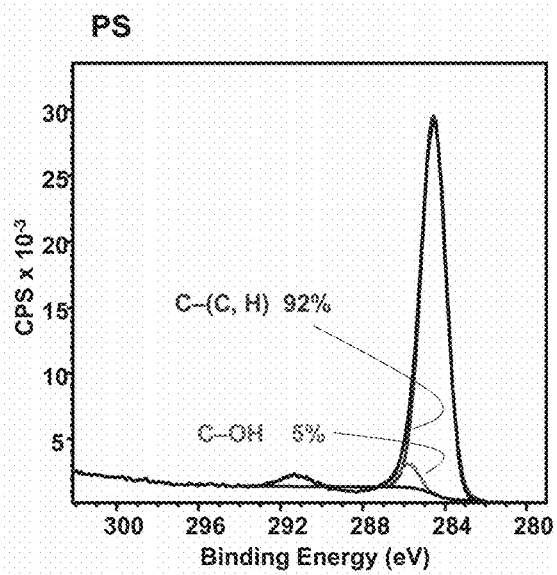
FIG. 21B1
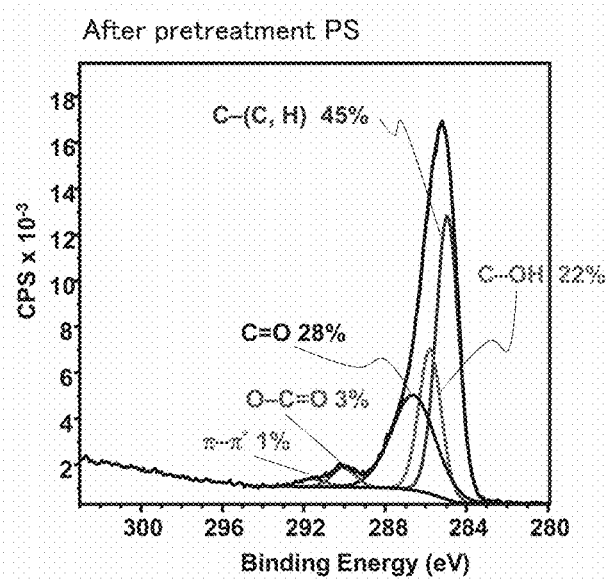
FIG. 21B2

METHOD FOR SELECTIVELY BINDING TARGET MOLECULE TO POLYMER MOLDED BODY AND METHOD FOR PRODUCING TARGET MOLECULE-BOUND POLYMER MOLDED BODY USING THE SAME

TECHNICAL FIELD

The present invention relates to a method for selectively binding a target molecule to a polymer molded body and a method for producing a target molecule-bound polymer molded body using the same.

BACKGROUND ART

In various industries, products using polymers are produced. Among them, low density polyethylene, high density polyethylene, polypropylene, polyvinyl chloride, and polystyrene are actively produced as the big five general-purpose resins and are used as molded body raw materials. In order to further impart a desired function depending on the application to the polymer molded body, for example, there is an attempt to apply a modifying treatment to the surface of the polymer molded body after molding. It is considered that the modifying treatments can improve of adhesion, control of water repellency, and chemical modification while maintaining the durability and the like inherent to the polymer, for example.

As the modifying treatments, for example, corona discharge treatments, plasma discharge treatments, grafting treatments, and the like are known. Each of these modifying treatments, however, is a physical treatment method, and there has been no significant technological progress in the past ten years.

On the other hand, as a chemical treatment method, a method using a heavy metal oxidizing agent is known. This method, however, uses a large amount of a heavy metal oxidizing agent, and thus has problems such as toxicity, processing cost, and environment.

In addition, it is difficult to selectively modify a desired region of a polymer molded body by these methods, for example.

SUMMARY OF INVENTION

Technical Problem

With the foregoing in mind, it is an object of the present invention to provide a new method for modifying a polymer molded body and binding a target molecule. More specifically, it is an object of the present invention to provide a new method for selectively binding the target molecule of the surface of the polymer molded body.

Solution to Problem

In order to achieve the above object, the present invention provides a method for selectively binding a target molecule to a polymer molded body, including: a pretreatment step of irradiating a compound radical with light in a reaction system including a polymer molded body and the compound radical to modify a selected surface of the polymer molded body; and a binding step of bringing a target molecule into contact with the polymer molded body after the pretreatments to bind the target molecule to the selected surface of the polymer molded body, wherein in the pretreatment step, the selected surface is modified by selectively irradiating the selected surface on the surface of the polymer molded body with light in a presence of the compound radical, or irradiating the compound radical with light while masking a surface other than the selected surface on the surface of the polymer molded body, wherein the compound radical is a radical containing one element selected from the group consisting of Group 15 elements and Group 16 elements, and a Group 17 element.

The present invention also provides a method for producing a target molecule-bound polymer molded body, including: a binding step of binding a target molecule to a polymer molded body, wherein a binding method in the binding step is the binding method according to the present invention.

Advantageous Effects of Invention

According to the target molecule binding method of the present invention, first, the polymer molded body can be easily selectively modified by selective treatments of the polymer molded body in the pretreatment step. As a result, a selected surface on the surface of the polymer molded body can be modified to have a reactivity different from that of a non-selected surface. Therefore, according to the present invention, it is possible to selectively bind the target molecule to the selected surface in the binding step by utilizing the difference in reactivity between the selected surface and the non-selected surface on the surface of the polymer molded body after the pretreatments.

BRIEF DESCRIPTION OF DRAWINGS

FIG. 8 shows graphs showing the results of XPS of Example B2.

FIG. 21 shows graphs showing the results of XPS of Example 9.

DESCRIPTION OF EMBODIMENTS

Figure 1:
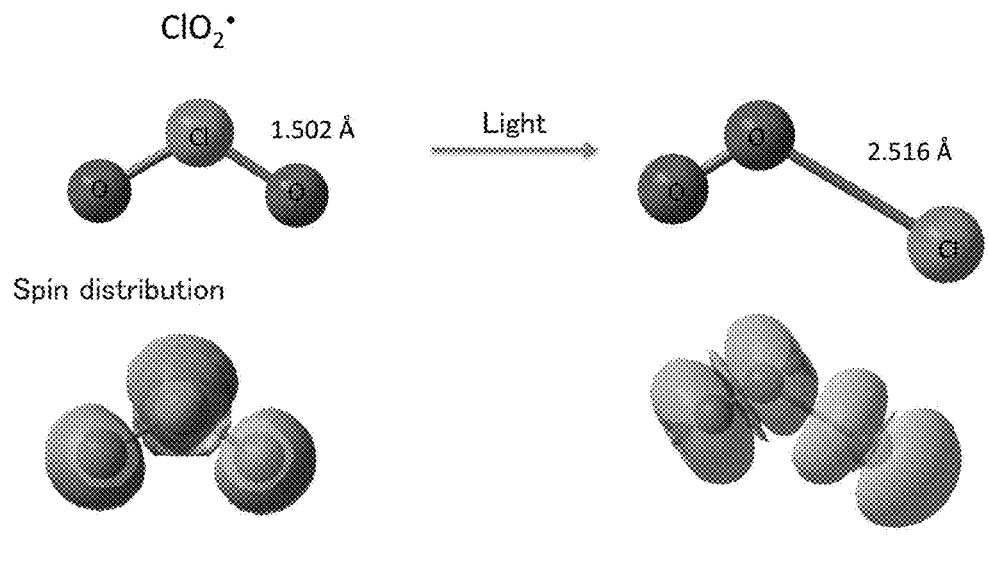
FIG. 1 shows an example of the prediction based on the calculation result of UCAM-B3LYP/6-311+G(d, p) def2TZV in the case where a chlorine dioxide radical ($ClO_2^-$) is irradiated with light.

In the target molecule binding method of the present invention, for example, the target molecule is at least one functional molecule selected from the group consisting of coloring molecules, fluorescent molecules, biological molecules, drug molecules, catalyst molecules, coating material molecules, fragrance molecules, adsorbate molecules, metal colloid molecules, metal complex molecules, charge regulating molecules, and affinity regulating molecules.

In the target molecule binding method of the present invention, for example, the biological molecule is at least one selected from the group consisting of antibodies, growth factors, proliferators, and adhesive factors.

In the binding step of the target molecule binding method of the present invention, for example, the target molecule is directly bound to the polymer molded body after the pretreatment step.

In the binding step of the target molecule binding method of the present invention, for example, the target molecule is bound to the polymer molded body after the pretreatment step through a linker molecule.

In the target molecule binding method of the present invention, for example, the Group 15 element is at least one of N or P, the Group 16 element is at least one selected from the group consisting of O, S, Se, and Te, and the Group 17 element is at least one selected from the group consisting of F, Cl, Br, and I. In the present invention, Group 15, Group 16, and Group 17 are groups of the periodic table.

In the target molecule binding method of the present invention, for example, the compound radical is an oxide radical.

In the target molecule binding method of the present invention, for example, the compound radical is an oxide radical of the Group 17 element.

In the target molecule binding method of the present invention, for example, the compound radical is a chlorine dioxide radical.

In the target molecule binding method of the present invention, for example, the selected surface of the polymer molded body is oxidized in the pretreatment step, and the target molecule is bound to an oxidized site of the polymer molded body in the reaction step.

In the target molecule binding method of the present invention, for example, the polymer molded body is at least one selected from the group consisting of sheets, films, plates, tubes, pipes, rods, beads, and blocks.

In the target molecule binding method of the present invention, for example, the polymer molded body includes a polymer having a carbon-hydrogen bond.

In the target molecule binding method of the present invention, for example, the polymer is a polyolefin.

The present invention is described below in more detail with reference to illustrative examples. The present invention, however, is not limited by the following description.

As described above, the method for selectively binding a target molecule to a polymer molded body of the present invention includes a pretreatment step of irradiating a compound radical with light in a reaction system including a polymer molded body and the compound radical to modify a selected surface of the polymer molded body; and a binding step of bringing a target molecule into contact with the polymer molded body after the pretreatments to bind the target molecule to the selected surface of the polymer molded body, wherein the selected surface is modified by selectively irradiating the selected surface on the surface of the polymer molded body with light in a presence of the compound radical, or irradiating the compound radical with light while masking a surface other than the selected surface on the surface of the polymer molded body, wherein the compound radical is a radical containing one element selected from the group consisting of Group 15 elements and Group 16 elements, and a Group 17 element.

(1) Polymer Molded Body

The object to be treated in the present invention is the polymer molded body as described above. The polymer molded body is solidified by molding a polymer, for example.

The molding method, shape, and the like of the polymer molded body are not limited in any way. The molding method is not particularly limited, and may be, for example, a known method such as compression molding, transfer molding, extrusion molding, calendar molding, inflation molding, blow molding, vacuum molding, injection molding, or the like. The shape of the molded body is not particularly limited, and examples thereof include sheets, films, plates, tubes, pipes, rods, beads, and blocks. The polymer molded body may be, for example, a non-porous body, a porous body, a non-woven fabric, or a woven fabric.

The polymer constituting the selected surface of the polymer molded body can be modified by light irradiation in the presence of the compound radical in the pretreatment step. A site modified by the pretreatment step in the polymer is hereinafter referred to as a "modified site", and a group of the modified site in the polymer is hereinafter referred to as a "modified functional group".

The polymer constituting the selected surface may have a side chain modified or a main chain modified by the pretreatment step, for example. The modification of the main chain may be, for example, a modification of the end of the main chain or a modification of the inside of the main chain. The modification (also referred to as a change) is, for example, the introduction of a Group 15 element, a Group 16 element, and a Group 17 element derived from the compound radical into the side chain or the main chain. Thus, the selected surface of the polymer molded body is modified by the introduction of the element into the side chain and the main chain. The main chain is, for example, a chain of carbon atoms and/or heteroatoms, and the side chain is, for example, a chain (branched chain) branched from the main chain connected to a carbon atom or a heteroatom constituting the main chain.

The polymer contained in the polymer molded body is not particularly limited, and may be, for example, one type or a mixture of two or more types. The polymer may be, for example, a polymer alloy or a polymer compound.

The polymer may be, for example, a homopolymer or a copolymer. In the case of the copolymer, for example, the number of repeating units (monomers) is two or more.

The polymer may be, for example, a polymer having a melting point of room temperature or higher, or a polymer having a glass transition temperature of room temperature or higher. The polymer may be a polymer having a relatively high degree of crystallinity, for example. When the polymer has the above-mentioned melting point condition, the degree of crystallinity is, for example, 20% or more, 30% or more, or 35% or more. The molded body of the polymer can be formed by a known molding method such as, for example, melting by heating, and then shaping and cooling.

The polymer contains, for example, carbon and hydrogen, and the polymer may be a polymer having a carbon-hydrogen bond. In the case of the polymer having a carbon-hydrogen bond, according to the target molecule binding method of the present invention, for example, the carbon-hydrogen bond of the polymer is modified on the selected surface of the polymer molded body. Specific examples of the polymer include, but are not limited to, polyolefin, polyvinyl chloride, polystyrene, polylactic acid, polyhydroxybutyrate, silicone polymer, natural rubber, phenolic resin, epoxy resin, diallylphthalate resin, polycarbonate (PC), polymethylmethacrylate (PMMA), polydimethylsiloxane (PDMS), polyarylate (PAR) such as amorphous polyarylate, polyether sulfonic acid (PES), polyparaphenylene vinylene (PPV), polythiophene (PAT), polyfluorene (PF), polyphenylene sulfide (PPS), liquid crystal polymer (LCP), polyparaphenylene (PPP), PEDOT/PSS, and polyaniline/PSS.

The polyolefin may be, for example, a polymer of an olefin (polyolefin) having 2 to 20 carbon atoms. Examples of the polyolefin include polyethylene (PE) such as low density polyethylene and high density polyethylene, and polypropylene (PP). The polyolefin may be, for example, a copolymer.

The polymer in which the side chain is modified may be, for example, a polymer having a hydrocarbon group or a derivative group thereof as a side chain. In the present invention, a "polymer having a hydrocarbon group or a derivative group thereof as its side chain" is hereinafter also formally referred to as a "polymer A".

Specific examples of the polymer A in which the side chain is modified include, but are not limited to, the polyolefin (e.g., polyethylene (PE) such as low density polyethylene and high density polyethylene, polypropylene (PP)), polyvinyl chloride, polystyrene, polylactic acid, polyhydroxybutyrate, silicone polymer, natural rubber, phenolic resin, epoxy resin, diallylphthalate resin, polycarbonate (PC), polymethylmethacrylate (PMMA), polydimethylsiloxane (PDMS), polyarylate (PAR) such as amorphous polyarylate, polyether sulfonic acid (PES), polyparaphenylene vinylene (PPV), polythiophene (PAT), polyfluorene (PF), polyphenylene sulfide (PPS), liquid crystal polymer (LCP), polyparaphenylene (PPP), PEDOT/PSS, and polyaniline/PSS.

The polymer A may be, for example, a homopolymer or a copolymer. In the case of a homopolymer, for example, a repeating unit (monomer) forming a straight chain has a side chain. In the case of a copolymer, for example, as to each repeating unit (each monomer) forming a straight chain, at least one type of monomer may have a side chain, or two or more types of monomers may have a side chain, for example.

The hydrocarbon group or a derivative group thereof which is the side chain of the polymer A is not particularly limited, and is, for example, a monovalent group of the following hydrocarbon or a derivative thereof. The hydrocarbon may be, for example, non-aromatic or aromatic and may be saturated or unsaturated. Specifically, the hydrocarbon may be, for example, a linear or branched saturated or unsaturated hydrocarbon (e.g., a linear or branched alkane, a linear or branched alkene, a linear or branched alkyne, etc.). The hydrocarbon may also be a saturated or unsaturated hydrocarbon (e.g., cycloalkane, cycloalkene, etc.), including, for example, a non-aromatic cyclic structure. The hydrocarbon may be an aromatic hydrocarbon. The hydrocarbon may or may not have, for example, one or more aromatic or non-aromatic rings in its structure. The hydrocarbon may or may not have, for example, one or more hydrocarbon groups of linear or branched saturated or unsaturated hydrocarbons in its structure. The unsaturated hydrocarbon may be, for example, a ketone, an ester, an amide, or the like having a carbonyl group (—C(=O)—). The carbon number of the hydrocarbon is not particularly limited, and may be, for example, 1 to 40, 1 to 32, 1 to 24, 1 to 18, 1 to 12, 1 to 6, or 1 to 2, and when the hydrocarbon is an unsaturated hydrocarbon, the carbon number may be, for example, 2 to 40, 2 to 32, 2 to 24, 2 to 18, 2 to 12, or 2 to 6. Specific examples of the hydrocarbon include methane, ethane, propane, n-butane, 2-methylpropane, n-pentane, n-hexane, ethylene, propylene, 1,3-butadiene, acetylene, cyclopentane, cyclohexane, cycloheptane, cyclooctane, methylcyclohexane, cyclohexene, benzene, toluene, o-xylene, m-xylene, p-xylene, methylene, durene, biphenyl, naphthalene, 1-methylnaphthalene, 2-methylnaphthalene, anthracene, phenanthrene, pyrene, and styrene.

The "derivative" of the hydrocarbon is, for example, an organic compound containing a heteroelement (an element other than carbon and hydrogen). The heteroelement is not particularly limited, and examples thereof include oxygen (O), nitrogen (N), sulfur (S), and halogen. Examples of the halogen include fluorine (F), chlorine (Cl), bromine (Br), and iodine (I). The derivative may be, for example, an organic compound having a structure in which a hydrocarbon group is bound to any substituent or any atomic group. The derivative may be, for example, a compound having a structure in which a plurality of hydrocarbon groups is bound by any atomic group, and the hydrocarbon group may be substituted with any one or more of substituents, or may be unsubstituted. The hydrocarbon group is not particularly limited, and for example, monovalent or divalent or more groups derived from the hydrocarbon may be used. The hydrocarbon group may have, for example, one or more of its carbon atoms substituted with a heteroatom. Specifically, for example, a pyridyl group may be formed by substituting one carbon atom of a phenyl group (and a hydrogen atom bound thereto) with a nitrogen atom. The substituents or atomic groups are not particularly limited, and examples thereof include hydroxy groups, halogen groups (a fluoro group, a chloro group, a bromo group, an iodo group, etc.), alkoxy groups, aryloxy groups (e.g., a phenoxy group, etc.), carboxy groups, alkoxycarbonyl groups, aryloxycarbonyl groups (e.g., a phenoxycarbonyl group, etc.), mercapto groups, alkylthio groups, arylthio groups (e.g., a phenylthio group, etc.), amino groups (e.g., an amino group, an alkylamino group, a dialkylamino group, etc.) having substituents or without substituents, an ether bond (—O—), an ester bond (—CO—O—), and a thioether bond (—S—).

The polymer in which the end of the main chain is modified may be, for example, a polymer having a hydrocarbon group or a derivative group thereof as an end group. In the present invention, a "polymer having a hydrocarbon group or a derivative group thereof as its end" is hereinafter also formally referred to as a "polymer B".

The polymer B may be, for example, a homopolymer or a copolymer. In the case of a homopolymer, for example, a repeating unit (monomer) forming a straight chain may or may not have a side chain. In the case of a copolymer, for example, each repeating unit (each monomer) forming a straight chain may or may not have a side chain, for example. For example, at least one type of monomer may have a side chain, or two or more types of monomers may have a side chain, for example. In the polymer B, the side chain may be, for example, a side chain similar to that of the polymer A or a side chain other than that.

The hydrocarbon group or a derivative group thereof which is an end group of the polymer B is not particularly limited, and may be groups similar to the polymer A.

The polymer in which the inside of the main chain is modified is, for example, a polymer having a hydrocarbon group or a derivative group thereof inside the polymer. In the present invention, "a polymer having a hydrocarbon group or a derivative group thereof in its main chain" is hereinafter also formally referred to as "Polymer C".

Specifically, the polymer C may be, for example, a polymer of an olefin (polyolefin) having 2 to 20 carbon atoms. Examples of the polyolefin include polyethylene (PE) such as low density polyethylene and high density polyethylene, and polypropylene (PP). The polyolefin may be, for example, a copolymer.

The polymer C may be, for example, a homopolymer or a copolymer. In the case of a homopolymer, for example, a repeating unit (monomer) forming a straight chain may or may not have a side chain. In the case of a copolymer, for example, each repeating unit (each monomer) forming a straight chain may or may not have a side chain, for example. For example, at least one type of monomer may have a side chain, or two or more types of monomers may have a side chain, for example. In the polymer B, the side chain may be, for example, a side chain similar to that of the polymer A or a side chain other than that.

The hydrocarbon group or a derivative group thereof inside the polymer C is not particularly limited, and is, for example, a divalent group of a hydrocarbon or a derivative thereof. The hydrocarbon is, for example, an unsaturated hydrocarbon, and reference can be made to the description as to the Polymer A.

In the present invention, a chain compound (e.g., an alkane, an unsaturated aliphatic hydrocarbon, etc.) or a chain substituent derived from a chain compound (e.g., a hydrocarbon group such as an alkyl group, an unsaturated aliphatic hydrocarbon group, etc.) may be, for example, linear or branched, the carbon number may be, for example, 1 to 40, 1 to 32, 1 to 24, 1 to 18, 1 to 12, 1 to 6, or 1 to 2, and in the case of an unsaturated hydrocarbon group, the carbon number may be, for example, 2 to 40, 2 to 32, 2 to 24, 2 to 18, 2 to 12, or 2 to 6. In the present invention, the number of ring members (the number of atoms constituting a ring) of a cyclic compound (e.g., a cyclic saturated hydrocarbon, a non-aromatic cyclic unsaturated hydrocarbon, an aromatic hydrocarbon, a heteroaromatic compound, etc.) or a cyclic group derived from a cyclic compound (e.g., a cyclic saturated hydrocarbon group, a non-aromatic cyclic unsaturated hydrocarbon group, an aryl group, a heteroaryl group, etc.) is not particularly limited, and may be, for example, 5 to 32, 5 to 24, 6 to 18, 6 to 12, or 6 to 10. When a substituent or the like has isomers, for example, the type of the isomer is not particularly limited, and in the case of simply referring to a "naphthyl group" as a specific example, for example, a 1-naphthyl group or a 2-naphthyl group may be used.

In the present invention, the isomers are not particularly limited, and are, for example, tautomers or stereoisomers (e.g., a geometric isomer, a conformer, and an optical isomer). In the present invention, the salt is not particularly limited, and may be, for example, an acid addition salt or a base addition salt. An acid that forms the acid addition salt may be either an inorganic acid or an organic acid, and a base that forms the base addition salt may be either an inorganic base or an organic base. The inorganic acid is not particularly limited, and examples thereof include sulfuric acid, phosphoric acid, hydrofluoric acid, hydrochloric acid, hydrobromic acid, hydroiodic acid, hypofluorous acid, hypochlorous acid, hypobromous acid, hypoiodous acid, fluorous acid, chlorous acid, bromous acid, iodous acid, fluorine acid, chloric acid, bromic acid, iodic acid, perfluoric acid, perchloric acid, perbromic acid, and periodic acid. The organic acid also is not particularly limited, and examples thereof include p-toluenesulfonic acid, methanesulfonic acid, oxalic acid, p-bromobenzenesulfonic acid, carbonic acid, succinic acid, citric acid, benzoic acid, and acetic acid. The inorganic base is not particularly limited, and examples thereof include ammonium hydroxides, alkali metal hydroxides, alkaline-earth metal hydroxides, carbonates, and hydrogencarbonates. More specifically, the inorganic base may be, for example, sodium hydroxide, potassium hydroxide, potassium carbonate, sodium carbonate, sodium hydrogencarbonate, potassium hydrogencarbonate, calcium hydroxide, and calcium carbonate. The organic base also is not particularly limited, and examples thereof include ethanolamine, triethylamine, and tris(hydroxymethyl)aminomethane.

In the present invention, the polymer may include, for example, only one type of the polymer A, the polymer B, and the polymer C, or may include two or more types or all three types of them. The polymer may include, for example, at least one of the polymer A, the polymer B, and the polymer C, and other polymers. The other polymers are in no way limited.

(2) Compound Radical

As described above, the compound radical is a radical containing at least one of Group 15 elements and Group 16 elements, and a Group 17 element. In the present invention, for example, any one type of the compound radicals may be used, or two or more types of them may be used in combination. In the present invention, the compound radical can be appropriately selected depending on, for example, the type, reaction conditions, and the like of the polymer in the polymer molded body.

The Group 15 element is, for example, N or P, the Group 16 element is, for example, O, S, Se, or Te, and the Group 17 element is, for example, halogen, and is F, Cl, Br, or I. Among the Group 15 element and the Group 16 element, for example, the Group 16 element is preferable. Among the Group 16 elements, for example, oxygen and sulfur are preferable. The compound radical is preferably an oxide radical containing oxygen as the Group 16 element, and specifically, a halogen oxide radical is preferable. Examples of the halogen oxide radical include $F_2O^{\cdot}$ (difluoric oxygen radical), $F_2O_2^{\cdot}$ (difluoric dioxygen radical), $ClO_2^{\cdot}$ (chlorine dioxide radical), $BrO_2^{\cdot}$ (bromine dioxide radical), and $I_2O_5^{\cdot}$ (iodine oxide (V)). Among them, chlorine dioxide radical is preferable from the viewpoints of cost, ease of handling, reactivity, safety, and the like. The compound radical may be generated from a source (radical generating source) of the compound radical, for example, as described below.

When the compound radical (the oxide radical) containing an oxygen atom (O) is used in the pretreatment step, the polymer is oxidized by introduction of an oxygen atom on the selected surface of the polymer molded body. As a specific example, when the polymer has the carbon-hydrogen bond, for example, an oxygen atom is introduced into the carbon-hydrogen bond. When the compound radical (sulfide radical) containing a sulfur atom (S) is used, the polymer is sulfurized by introduction of a sulfur atom on the selected surface of the polymer molded body. When the compound radical containing halogen is used, the polymer is halogenated by introduction of a halogen atom on the selected surface of the polymer molded body. When the halogen oxide radical containing a halogen atom and an oxygen atom is used, the polymer is halogenated by introduction of a halogen atom and oxidized by introduction of an oxygen atom on the selected surface of the polymer molded body.

The pretreatment step in the present invention can be performed using, for example, a reaction system containing the polymer molded body and the compound radical. The compound radical may be generated in the reaction system, or the compound radical generated separately may be introduced into the reaction system, for example. The method of generating the compound radical used in the pretreatment step is not particularly limited. The generation of the compound radical will be described below.

(3) Reaction System of Pretreatment Step

In the pretreatment step, the reaction system containing the compound halogen may be a gas-phase reaction system containing a gas phase or a liquid-phase reaction system containing a liquid phase, for example. The polymer molded body is disposed in the reaction system. In the reaction system, it is preferable that the polymer molded body is immobilized in the reaction system from the viewpoint of, for example, the efficiency of treatments.

(3-1) Gas-Phase Reaction System

When the reaction system is a gas-phase reaction system, for example, the gas phase may contain the compound radical. The type of the gas phase is not particularly limited, and is air, nitrogen, a rare gas, oxygen, or the like.

In the present invention, for example, the compound radical may be introduced into the gas-phase reaction system before or simultaneously with the pretreatment step. For example, the introduction of the compound radical into the gas-phase reaction system can be performed by introducing a gas containing the compound radical into the gas phase. In addition, the introduction of the compound radical into the gas-phase reaction system may be performed, for example, by transferring the compound radical generated in a liquid-phase reaction system for radical generation into the gas phase as described below.

As a specific example, when the compound radical is the chlorine dioxide radical, the chlorine dioxide radical can be present in the gas phase, for example, by introducing chlorine dioxide gas into the gas phase. The chlorine dioxide radical can also be generated in the gas phase, for example by an electrochemical method.

The gas phase may or may not contain components other than the raw material (hydrocarbon or a derivative thereof) and the compound radical. The other component is not particularly limited, and may be, for example, oxygen ($O_2$).

The compound radical may be generated from a compound radical generating source and introduced into the gas phase, for example, in the compound radical generating step described below.

(3-2) Liquid-Phase Reaction System

When the reaction system is a liquid-phase reaction system, for example, the liquid phase may contain the compound radical. The liquid phase contains, for example, a phase of an organic solvent (organic phase). The liquid-phase reaction system may be, for example, a one-phase reaction system containing only the organic phase or a two-phase reaction system containing the organic phase and the aqueous phase. The organic phase may be, for example, one phase or two or more phases.

The organic solvent is not particularly limited. For example, only one type of the organic solvent may be used, or two or more types may be used in combination. The organic solvent may be, for example, a hydrocarbon solvent, a halogenated solvent, a fluorous solvent, or the like. When the liquid-phase reaction system is the two-phase reaction system, the organic solvent is preferably, for example, a solvent that can form the two-phase system, i.e., a solvent that separates from an aqueous solvent constituting the aqueous phase described below, or a solvent that is poorly soluble or insoluble in the aqueous solvent.

The hydrocarbon solvent is not particularly limited, and for example, an aromatic system is preferable, and specific examples thereof include n-hexane, cyclohexane, benzene, toluene, o-xylene, m-xylene, and p-xylene. The hydrocarbon solvent is preferably an aromatic hydrocarbon solvent, for example.

The "halogenated solvent" refers, for example, to a solvent in which all or most of the hydrogen atoms of a hydrocarbon have been substituted with halogen. The halogenated solvent may be, for example, a solvent in which 50% or more, 60% or more, 70% or more, 80% or more, or 90% or more of the number of hydrogen atoms of the hydrocarbon is substituted with halogen. The halogenated solvent is not particularly limited, and examples thereof include methylene chloride, chloroform, carbon tetrachloride, carbon tetrabromide, and a fluorous solvent described below.

The "fluorous solvent" is one of the aforementioned halogenated solvents, and is, for example, a solvent in which all or most of the hydrogen atoms of a hydrocarbon have been substituted with fluorine atoms. The fluorous solvent may be, for example, a solvent in which 50% or more, 60% or more, 70% or more, 80% or more, or 90% or more of the number of hydrogen atoms of the hydrocarbon are substituted with fluorine atoms. Since the fluorous solvent is not easily miscible with water, the fluorous solvent is suitable for forming the two-phase reaction system, for example. In the present invention, since the reactivity of the fluorous solvent itself is low, there is an advantage that side reactions in the pretreatment step can be further suppressed or prevented. Further, for example, when the reaction system for generating the compound radical described below is used as it is as the liquid-phase reaction system in the pretreatment step, side reactions in the generation of the compound radical can be suppressed. Examples of the side reaction include an oxidation reaction of the solvent, a hydrogen extraction reaction or a halogenation reaction (for example, a chlorination reaction) of the solvent due to the radical, and a reaction between a radical derived from the raw material compound and the solvent.

Examples of the fluorous solvent include solvents represented by the following chemical formulae (F1) to (F6), and among them, for example, a solvent represented by the chemical formula (F1) (n=4, perfluorohexane $CF_3(CF_2)_4 CF_3$), is preferable.

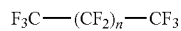

(F1)

$n = 4$, boiling point = 60° C.
$n = 5$, boiling point = 82° C.
$n = 6$, boiling point = 104° C.
$n = 7$, boiling point = 125° C.

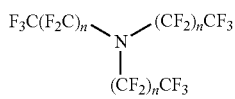

(F2)

$n = 1$ or 4
$n = 1$, boiling point = 135° C.

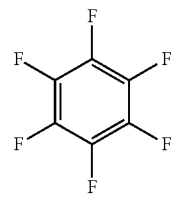

(F3)

boiling point = 81° C.

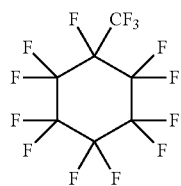

(F4)

boiling point = 76° C.

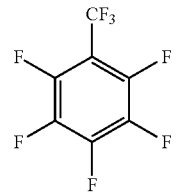

(F5)

boiling point = 104° C.

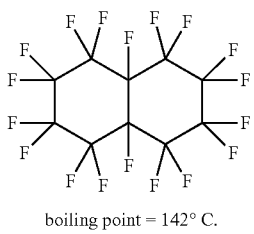

(F6)

boiling point = 142° C.

The boiling point of the organic solvent is not particularly limited. The organic solvent can be appropriately selected depending on, for example, the temperature condition of the pretreatment step. In the pretreatment step, for example, when the reaction temperature is set to a high temperature, a solvent having a high boiling point can be selected as the organic solvent. In the pretreatment step of the present invention, for example, as described below, heating is not indispensable, and, for example, the reaction can be performed, at ordinary temperature and normal pressure. In such a case, the organic solvent needs not to be, for example, a solvent having a high boiling point, and a solvent having a low boiling point can be used from the viewpoint of ease of handling.

The organic phase may contain, for example, only the compound radical, and the organic solvent, or may further include other components. The other components are not particularly limited and examples thereof include a Brønsted acid, a Lewis acid, and oxygen ($O_2$) as described below. In the organic phase, for example, the other components may be dissolved in the organic solvent or may be undissolved. In the latter case, the other component may be dispersed or precipitated in the organic solvent, for example.

The organic phase contains the compound radicals as described above. The compound radical may be caused to be contained in the organic phase by, for example, generating it in the organic phase or generating it in a region other than the organic phase and extracting it by the organic phase. That is, in the latter case, when the liquid-phase reaction system is a one-phase reaction system containing only an organic phase, for example, the compound radical is separately generated in a region other than the organic phase which is the liquid-phase reaction system, the generated compound radical is extracted by the organic phase, and the extracted organic phase containing the compound radical is subjected to the pretreatment step as the reaction system. The generation of the compound radical can be performed, for example, in a separately prepared aqueous phase as described below. On the other hand, in the case where the liquid-phase reaction system is a two-phase reaction system containing the organic phase and the aqueous phase, for example, the compound radical is generated in the aqueous phase, the generated compound radical is extracted from the aqueous phase in the organic phase, and the aqueous phase and the organic phase containing the compound radical are subjected to the pretreatment step as the two-phase reaction system.

The aqueous phase is, for example, a phase of an aqueous solvent. The aqueous solvent is, for example, a solvent that is separated from the solvent used in the organic phase. Examples of the aqueous solvent include water such as $H_2O$ and $D_2O$.

The aqueous phase may contain any component, for example, a Lewis acid, a Brønsted acid, a radical source, or the like, as described below. In the aqueous phase, these optional components may be, for example, dissolved or undissolved in the aqueous solvent. In the latter case, the optional component may be dispersed or precipitated in the aqueous solvent, for example.

(4) Target Molecule

In the binding step, the target molecule to be bound to the polymer molded body after the treatments is not particularly limited. In the present invention, as described above, the selected surface on the surface of the polymer molded body can be modified by the pretreatment step to have a reactivity different from that of a non-selected surface, and the target molecule can be selectively bound to the selected surface in the binding step by utilizing the difference in reactivity. As described above, since the present invention is characterized in that selective modification is performed in the pretreatment step, the target molecule to be bound to the modified selected surface is not particularly limited. The target molecule is also referred to as a target substance.

The target molecule may be, for example, a functional molecule exhibiting some functions, a molecule having no function, or a molecule whose function is unknown. Examples of the functional molecule include coloring molecules, fluorescent molecules, biological molecules, drug molecules, catalyst molecules, coating material molecules, fragrance molecules, adsorbate molecules, metal colloid molecules, metal complex molecules, charge regulating molecules, and affinity regulating molecules. Examples of the coloring molecule include dyes and pigments, and specific examples thereof include toluidine blue, rhodamine B, brilliant green, crystal violet, rhodamine 6G, methyl orange, and methyl red. Examples of the fluorescent molecule include NBD-PZ (4-nitro-7-piperazino benzofurazan), FITC, and pyrenes. The biological molecule is, for example, a molecule present in an organism and an analog thereof, and specific examples thereof include antibodies, growth factors, proliferators, and adhesive factors. Further, the drug molecule is not particularly limited as long as it is a molecule that exhibits the drug efficacy, and may be, for example, an active ingredient or the like in a medicinal product. Examples of the charge regulating molecule include positive charge molecules rich in positive charge and negative charge molecules rich in negative charge, and specific examples of the positive charge molecule include cationic polymer molecules such as polylysine. Examples of the affinity regulating molecule include hydrophilic molecules and hydrophobic molecules, and the hydrophilic molecule may be, for example, a hydrophilic polymer or the like.

The target molecule in the binding step may be, for example, a molecule exhibiting binding reactivity to a further target molecule. In this case, for example, the former target molecule may be referred to as a first target molecule, and the latter further target molecule may be referred to as a second target molecule. In this aspect, for example, when the second target molecule is bound to the polymer molded body, first, the first target molecule is bound to the modified selected surface of the polymer molded body, and further, the second target molecule is brought into contact with the first target molecule bound to the selected surface, whereby the second target molecule is bound to the selected surface through the first target molecule. When the first target molecule is superior to the second target molecule in binding reactivity with respect to the group (modified functional group) at the modified site on the selected surface, for example, it is preferable to bind the first target molecule to the selected surface and then further bind the second target molecule thereto. The first target molecule and the second target molecule may be, for example, a combination having binding reactivity.

The combination of the first target molecule and the second target molecule is not particularly limited. The necessity of the first target molecule can be determined in accordance with, for example, the type of the modified functional group and the type of the second target molecule, and the type of the first target molecule can also be appropriately determined in accordance with the type of the modified functional group and the type of the second target molecule. When the second target molecule is, for example, an amino acid, a peptide, or a protein, a functional group introduced by the first target molecule may be, for example, epoxide, imide, or the like, and the second molecule used for introducing the functional group may be, for example, epichlorohydrin or the like for epoxide, or N-hydroxysuccinimide (NHS) or the like for imide.

Next, each step of the present invention will be described. Hereinafter, as the target molecule, the functional molecule will be described as an example, but the present invention is not limited thereto. The description with the functional molecule as an example can be read by replacing the functional molecule with the target molecule.

(5) Pretreatment Step

The pretreatment step in the present invention is a pretreatment step of irradiating the compound radical with light in a reaction system including the polymer molded body and the compound radical to modify the surface of the polymer molded body, and specifically, the following first aspect or second aspect can be given. The first aspect of the pretreatment step is an aspect in which the selected surface is modified by selectively irradiating a selected surface on the surface of the polymer molded body in the presence of the compound radical, and the second aspect is an aspect in which the selected surface is modified by irradiating the compound radical with light while masking a surface other than the selected surface on the surface of the polymer molded body.

The polymer on the selected surface of the polymer molded body can be selectively modified by the pretreatment step. In the pretreatment step, for example, the degree of modification of the polymer can be adjusted by adjusting the amount of the compound radical, the time of light irradiation, and the like. Thus, for example, decomposition of the polymer due to excessive oxidation or the like can be prevented, and, for example, the characteristic inherent in the polymer can be prevented from being impaired.

It is considered that, when light irradiation is performed in the presence of the compound radical, the polymer is modified by the generation of the reactive substance from the compound radical. Here, first, the principle that the polymer is modified by light irradiation in the presence of the compound radical will be described below. When light irradiation is performed in the presence of the compound radical, the compound radical irradiated with light is predicted to be, for example, as shown in FIG. 1. FIG. 1 shows a chlorine dioxide radical ($ClO_2^·$), which is the oxide radical, as an example of the compound radical. FIG. 1 shows the result of the calculation by UCAM-B3LYP/6-311+G(d,p) def2TZV. The view on the left side of FIG. 1 shows the state of a chlorine dioxide radical ($ClO_2^·$) molecule before light irradiation, and the view on the right side of FIG. 1 shows the state of a chlorine dioxide radical ($ClO_2^·$) molecule after light irradiation. As shown in FIG. 1, before the light irradiation, two oxygen atoms O are each bound to a chlorine atom Cl, and the bond length of Cl—O is 1.502 Å (0.1502 nm). On the other hand, after the light irradiation, only one of the oxygen atoms O is bound to a chlorine atom Cl, the bond length of Cl—O is 2.516 Å (0.2516 nm), and the other of the oxygen atoms is bound to the oxygen atom that is bound to chlorine atom Cl. It is considered that, thereby the Cl—O bond is cleaved and a chlorine radical (Cl·) and an oxygen molecule ($O_2$) are generated. The chlorine radical serves as a hydrogen extractant with respect to the polymer and the oxygen molecule serves as an oxidizing agent with respect to the polymer. Specifically, the chlorine radical, for example, extracts hydrogen from the inside of the end, side chain, or main chain of the polymer to generate a radical derived from the polymer, and the oxygen molecule oxidizes the radical derived from the polymer to oxidize the inside of the end, side chain, or main chain. It is to be noted, however, that FIG. 1 shows an example of the prediction of the calculation result and by no means limits the present invention.

When the side chain of the polymer is an alkyl group (R), the carbon at the end of the alkyl group of the polymer side chain is oxidized to, for example, one of a hydroxymethyl group (—$CH_2OH$), a formyl group (—CHO), and a carboxy group (—COOH).

As a specific example, when the side chain of the polymer is a methyl group, the methyl group (—$CH_3$) is oxidized to, for example, at least one of a hydroxymethyl group (—$CH_2OH$), a formyl group (—CHO), and a carboxy group (—COOH). This presumes the following mechanism. That is, the radical of the Group 17 element (e.g., chlorine radical (Cl·)) and the molecule of the Group 15 element or the Group 16 element (e.g., oxygen molecule $O_2$) are generated from the compound radical (e.g., chlorine dioxide radical) by light irradiation. The methyl group (—$CH_3$) of the polymer is modified to a methyl radical (—$CH_2$·) owing to the radical of the Group 17 element (e.g., chlorine radical (Cl·)) serving as a hydrogen extractant, and then is modified into a hydroxymethyl group (—$CH_2OH$) owing to the molecule of the Group 15 element or the Group 16 element (e.g., oxygen molecule ($O_2$)) serving as an oxidizing agent. The hydroxymethyl group (—$CH_2OH$) is further oxidized to a formyl group (—CHO) or a carboxy group (—COOH). In the case where the polymer is polypropylene (PP), oxidation is possible as, for example, the following formula.

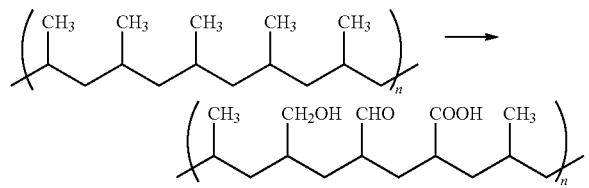

In the pretreatment step, when the side chain of the polymer is an ethyl group, the ethyl group (—$CH_2CH_3$) is oxidized to, for example, a hydroxyethyl group (—$CH_2CH_2OH$), an acetaldehyde group (—$CH_2CHO$), a carboxymethyl group (—$CH_2COOH$), or an acetyl group (—$COCH_3$).

In the pretreatment step, the conditions of light irradiation are not particularly limited. The wavelength of the light is not particularly limited, and the lower limit is, for example, 200 nm or more and the upper limit is, for example, 800 nm or less. The light irradiation time is not particularly limited, and the lower limit is, for example, 1 minute or more and the upper limit is, for example, 1000 hours. The reaction temperature is not particularly limited, and the lower limit is, for example, 0° C. or more, the upper limit is, for example, 100° C. or less or 40° C. or less, and the temperature is, for example, in the range from 0 to 100° C. or 0 to 40° C. The atmospheric pressure at the time of reaction is not particularly limited, and the lower limit is, for example, 0.1 MPa or more, the upper limit is, for example, 100 MPa or less, 10 MPa or less, or 0.5 MPa or less, and the atmospheric pressure is, for example, in the range from 0.1 to 100 MPa, 0.1 to 10 MPa, or 0.1 to 0.5 MPa. As the reaction conditions of the pretreatment step, for example, the temperature is in the range from 0 to 40° C. and the pressure is in the range from 0.1 to 0.5 MPa. According to the present invention, for example, the above-described pretreatment step or all the steps including the above-described pretreatment step can be performed under ordinary temperature (room temperature) and normal pressure (atmospheric pressure) without heating, pressurizing, depressurizing, or the like. The term "room temperature" is not particularly limited, and is, for example, 5 to 35° C. Therefore, even if the polymer includes, for example, a polymer having low heat resistance, it can be applied to the present invention. According to the present invention, for example, the reaction step or all the steps including the reaction step can be performed in the atmosphere without performing inert gas substitution or the like.

The light source of the light irradiation is not particularly limited, and, for example, visible light included in natural light such as sunlight can be used. When natural light is used, for example, excitation can be easily performed. As the light source, for example, a light source such as a xenon lamp, a halogen lamp, a fluorescent lamp, or a mercury lamp may be used instead of or in addition to the natural light. In the light irradiation, for example, a filter for cutting wavelengths other than the necessary wavelengths can be used as appropriate.

The reaction system may be, for example, the liquid-phase reaction system or the gas-phase reaction system. When the reaction system is the liquid-phase reaction system, for example, the polymer molded body is immersed in the liquid-phase reaction system containing the compound radical, and is selectively irradiated with light as described above.

The liquid-phase reaction system may be, for example, a one-phase reaction system consisting only of the organic phase or a two-phase reaction system containing the organic phase and the aqueous phase as described above. In the former case, for example, the organic phase is irradiated with light. In the latter case, for example, only the organic phase may be irradiated with light or both of the organic phase and the aqueous phase may be irradiated with light.

When the reaction system is the liquid-phase reaction system, it is preferable that the light irradiation be performed, for example, in a state where oxygen is dissolved in the liquid-phase reaction system. When the liquid-phase reaction system is the one-phase system, for example, oxygen is dissolved in the organic phase. When the liquid-phase reaction system is the two-phase system, for example, oxygen is dissolved in at least one of the organic phase and the aqueous phase, and preferably, in the aqueous phase. Specific examples of the light irradiation under the above-described conditions include, for example, a method of irradiating the liquid-phase reaction system with light while bringing the liquid-phase reaction system into contact with air or an oxygen gas and a method of irradiating the liquid-phase reaction system with light while introducing air or an oxygen gas into the liquid-phase reaction system. The former method can be performed, for example, by stirring the liquid-phase reaction system as described above. The latter method can be performed, for example, by inserting a tip of a tube or the like into the liquid-phase reaction system and feeding air or oxygen through the tube. When the liquid-phase reaction system includes oxygen, for example, modification of the polymer can be further accelerated.

The reaction system is accommodated, for example, in the vessel. The shape and material of the vessel are not particularly limited. In the pretreatment step, when light irradiation is performed from the outside of the vessel, the vessel is preferably formed of, for example, a light-transmissive member or a transparent member. Examples of the member include glass and resin.

The vessel may be, for example, a single chamber or may have two or more chambers. In the latter case, for example, the chambers may communicate with each other, one chamber may be a chamber for generating the compound radical, and the other chamber may be a chamber for performing the pretreatment step. When the reaction system is the gas-phase reaction system, for example, a compound radical may be generated as described below in one chamber and the thus generated compound radical may be led out to the other chamber, and the polymer molded body may be subjected to the pretreatment step in the other chamber. The compound radical may be generated in the one chamber, the reactive substance may be further generated from the thus generated compound radical by light irradiation, and the thus generated reactive substance may be led to the other chamber, and the polymer molded body may be modified in the other chamber.

In the pretreatment step of the present invention, the surface of the polymer molded body is an exposed surface of the polymer molded body, and the selected surface is a freely-selected region of the exposed surface of the polymer molded body. Here, the exposed surface is an exposed surface of the polymer molded body in a state where masking is not performed. As a specific example, the exposed surface of the polymer molded body may be, for example, a surface forming the outer shape of the polymer molded body (i.e., a surface exposed to the outside of the polymer molded body), or may be an exposed surface inside the polymer molded body (i.e., a surface forming the inner space of the polymer molded body and communicating with the outside of the polymer molded body). The latter is, for example, a surface forming an internal void in the porous body, a surface forming a hollow of a tube, a pipe, or the like. As will be described below, when light irradiation is performed after masking the polymer molded body, the masking is performed on a region of the exposed surface of the polymer molded body excluding the selected surface, and light irradiation is performed.

Next, a first aspect of the pretreatment step will be described. The first aspect is an aspect in which the selected surface is modified by selectively irradiating the selected surface of the surface of the polymer molded body with light, as described above. In the first aspect, for example, unlike the second aspect to be described below, the selective modification can be performed on the selected surface regardless of whether or not the surface of the polymer molded body is masked.

As described above, it is considered that the reactive substance (e.g., the hydrogen extractant and the oxidizing agent) is generated by irradiating the compound radical with light and the polymer is modified. Therefore, for example, it is possible to selectively modify the selected surface of the polymer molded body regardless of whether the surface of the polymer molded body is masked by performing light irradiation in such a manner that the reactive substance is selectively brought into contact with only the selected surface on the surface of the polymer molded body.

In the first aspect, as the selective light irradiation, for example, it is preferable to use means capable of performing pinpoint light irradiation such as a YAG laser beam, a Ti sapphire laser (femtosecond laser), a nitrogen laser, an excimer laser, an LED laser, or the like.

In the first aspect, for example, light irradiation may be performed in a state where masking is performed on the light emitting surface of the light source. In this case, for example, the light emitting surface of the light source may be masked to create desired shaped light so as to correspond to the shape of the selected surface of the polymer molded body, and then the light irradiation may be performed. Specifically, for example, when it is assumed that modification of a star-shaped selected surface is performed on the surface of the polymer molded body, a masking member having a star-shaped cavity is disposed on the light emitting surface of the light source, and then the polymer molded body is irradiated with light. Thereby, the star-shaped light irradiation is performed on the surface of the polymer molded body, and thus the selected surface irradiated with the light is selectively modified. The masking member may be disposed, for example, directly on the light emitting surface of the light source, or may be disposed between the light emitting surface of the light source and the vessel.

Further, on the wall surface of the vessel, for example, a region corresponding to the shape of the selected surface may be formed of a light-transmissive member, and a masking member may be disposed in a region other than the region corresponding to the shape of the selected surface, or a region other than the region corresponding to the shape of the selected surface may be formed of a light non-transmissive member.

Next, a second aspect of the pretreatment step will be described. The second aspect is an aspect in which the selected surface is modified by irradiating the compound radical with light in a state where a surface other than the selected surface on the surface of the polymer molded body is masked, as described above. In the second aspect, by masking the exposed surface of the polymer molded body, the reactive substance (e.g., the hydrogen extractant and the oxidizing agent) generated by irradiating the compound radical with light can be brought into contact with only the selected surface which is not masked. Thereby, the selected surface can be selectively modified.

In the second aspect, the surface other than the selected surface of the polymer molded body may be masked, and the method of light irradiation is not particularly limited. Here, in the exposed surface of the polymer molded body, the masking region may be, for example, the entire region of the exposed surface excluding the selected surface, or a freely-determined region of the exposed surface excluding the selected surface. In the second aspect, while it is preferable to mask the entire region of the exposed surface excluding the selected surface, masking need not be performed on a region of the exposed surface where light irradiation does not reach even if masking is not performed or a region of the exposed surface where the reactive substance generated from the compound radical by light irradiation does not reach, for example.

In the second aspect, the light irradiation may be performed on the compound radical included in the reaction system, and for example, the light irradiation may or may not reach the selected surface. That is, in the former case (i.e., when the light irradiation reaches the selected surface), the selected surface is irradiated with light, and a reactive substance is generated from the compound radical on the selected surface by the light irradiation, thereby modifying the selected surface. Further, even in the latter case, although the light irradiation does not reach the selected surface, a reactive substance is generated from the compound radical by the light irradiation, and the reactive substance comes into contact with the selected surface, whereby the selected surface can be modified.

The masking member used for the masking is not particularly limited. As the masking member, in the case of the former aspect, for example, a member capable of preventing the light emitted from the light source from reaching the non-selected surface is preferable. The masking member may be, for example, a light shielding member, and specific examples thereof include a member that reflects light and a member that absorbs light. As the masking member, in the case of the latter aspect, for example, a member capable of preventing a reaction between the reactive substance generated by light irradiation from the compound radical and the selected surface of the polymer molded body is preferable. The masking agent may be, for example, a member that prevents physical contact so that the selected surface of the polymer molded body does not come into contact with the reactive substance, and may be a common masking member that can be disposed on the surface of the polymer molded body. It is preferable that the masking is performed by directly immobilizing the masking member on the polymer molded body, for example.

In the second aspect, when the reaction system is the liquid-phase reaction system, for example, the polymer molded body may be immersed in the liquid-phase reaction system in a vessel and irradiated with light in a state where the masking member is immobilized on the non-selected surface of the polymer molded body. Further, for example, the polymer molded body may be immersed in the liquid-phase reaction system in a vessel, the masking member may be disposed between a light source and the vessel, and light irradiation may be performed.

When the reaction system is the gas-phase reaction system, it is preferable to use, for example, a vessel having two chambers communicating to each other as described above as the vessel. In this case, a radical generating reaction system (liquid-phase reaction system) for generating the compound radical to be described below is placed in one chamber, and the polymer molded body which has been masked is placed in the other chamber. Both of the chambers communicate with each other so that a gas passes therebetween in an area above the radical generating reaction system, for example. Next, in the one chamber, the compound radical is generated by the radical generating reaction system, and the compound radical is moved to the gas phase above the radical generating reaction system. Then, the reactive substance is generated from the compound radical by irradiating the gas phase in the one chamber with light. Since the vessels are in communication with each other as described above, the reactive substance generated in the one chamber moves to the other communicating chamber. Since the polymer molded body placed in the other chamber is masked, the reactive substance comes into contact only with the unmasked selected surface of the polymer molded body. Thereby, the selected surface of the polymer molded body can be modified. According to this aspect, in the other chamber, the polymer molded body can be modified without being immersed in a liquid, for example. Therefore, the polymer molded body after the pretreatments can be subjected to the subsequent binding step without performing, for example, wiping, drying, or the like.

According to the pretreatment step, by a very simple method of performing light irradiation in the presence of the compound radical, the radical of the Group 17 element (e.g., chlorine atom radical Cl·) and the molecule of the Group 15 element or the Group 16 element (e.g., oxygen molecule $O_2$) can be generated and the reaction (e.g., oxidizing reaction) with respect to the polymer can be performed to selectively modify the polymer. Even under extremely mild conditions such as ordinary temperature and normal pressure, for example, the polymer on the selected surface can be efficiently modified by such a simple method.

According to the pretreatment step, for example, the polymer on the selected surface of the polymer molded body can be modified without using a toxic heavy metal catalyst or the like. Therefore, as described above, for example, the reaction can be performed under extremely mild conditions and the polymer can be efficiently modified by a method having a very small environmental load.

As a method of oxidizing a polymer, a method of adding a compound such as maleic acid or acrylic acid to a polymer such as PE or PP by using peroxide has been known. However, since these compounds are accompanied by a cross-linking reaction, a decomposition reaction, and the like of PE and PP, the compounds are only introduced at about several weight %, and the introduction rate is low in practical use. In contrast, according to the present invention, the content of modified sites in the polymer can be relatively improved as compared to the conventional method.

(6) Binding Step

In the present invention, the binding step is a step of bringing the target molecule into contact with the polymer molded body after the pretreatments to bind the target molecule to the selected surface of the polymer molded body. As described above, by the pretreatment step, the selected surface on the surface of the polymer molded body is modified to have a reactivity different from that of a non-selected surface. Therefore, according to the binding step, for example, by utilizing the difference in reactivity between the selected surface and the non-selected surface, when the target molecule is brought into contact with the polymer molded body after the pretreatments, the target molecule can be selectively bound to the selected surface. In the present invention, the type of the bond is not particularly limited, and examples thereof include ionic bonds such as salt formation, covalent bonds, π bonds, hydrogen bonds, van der Waals forces, and coordination bonds.

The reaction between the polymer molded body after the pretreatments and the target molecule due to the contact is not particularly limited. As described above, the present invention is characterized in that the difference in reactivity between the selected surface and the non-selected surface due to the pretreatment step is utilized, and therefore, for example, the reaction mechanism of binding by contact between the polymer molded body after the pretreatments and the target molecule can be appropriately set depending on the modification state by the pretreatment step and the type of desired target molecule.

The reaction system in the binding step is not particularly limited. As the reaction system, for example, the reaction system used in the pretreatment step may be used, or a reaction system corresponding to the target molecule may be used. The reaction system includes, for example, an organic phase or an aqueous phase, and the organic solvent and the aqueous solvent are, for example, the same as those described above.

When the target molecule is a molecule having reactivity with the modified functional group of the modified site on the selected surface of the polymer molded body, the target molecule can be directly bound to the selected surface of the polymer molded body by bringing the target molecule into contact with the polymer molded body, for example. As a specific example, the case where the compound radical is the oxide radical and the selected surface of the polymer molded body is oxidized in the pretreatment step will be described. In this case, when the target molecule is a molecule having reactivity with a functional group having an oxygen atom, for example, the target molecule can be bound to the functional group of the selected surface by directly reacting the polymer molded body with the target molecule. The target molecule may be, for example, a target molecule having an amino group that shows reactivity with the functional group having an oxygen atom, and specific examples thereof include a protein having an amino group such as an antibody, a chromogenic molecule having an amino group, and a fluorescent molecule. Examples of the functional group of the selected surface by oxidization include a hydroxymethyl group ($—CH_2OH$), a formyl group (—CHO), and a carboxy group (—COOH) as described above. It is to be noted that these are merely examples and the present invention is not limited thereto.

On the other hand, when the target molecule is a molecule having no reactivity or weak reactivity with the modified functional group at the modified site on the selected surface of the polymer molded body, for example, the target molecule can be used as the second molecule, and the target molecule can be bound to the polymer molded body through a linker molecule which is the first molecule. In this case, as the linker molecule (the first target molecule), for example, a molecule having reactivity with the modified functional group of the modified site on the selected surface of the polymer molded body and having reactivity with the target molecule (the second target molecule) can be used. In this case, the present invention includes a step of reacting the linker molecule with the polymer molded body after the pretreatment step to bind the linker molecule to the selected surface of the polymer molded body, for example. This linker molecule binding step may be performed between the pretreatment step and the second target molecule binding step, or may be performed simultaneously with the second target molecule binding step, for example.

(7) Compound Radical Generating Step

In the present invention, the compound radical used in the pretreatment step may be introduced, as described above, by introducing a gas containing the compound radical into the reaction system of the pretreatment step or by transferring the compound radical generated in a liquid-phase reaction system for radical generation into the reaction system of the pretreatment step, for example. In the latter case, the present invention may further include, for example, a compound radical generating step of generating the compound radical. The present invention is characterized in that the compound radical is used in the pretreatment step, and the method of generating the compound radical is not limited at all.

In the present invention, the compound radical generating step can be performed, for example, before or simultaneously with the pretreatment step. The method of generating the compound radical is not particularly limited.

In the compound radical generating step, for example, the compound radical may be generated using a reaction system for radical generation. The reaction system for radical generation may be used as it is as the liquid-phase reaction system in the pretreatment step, for example, after the compound radical has generated. An aspect in which the reaction system for radical generation is used as the liquid-phase reaction system in the pretreatment step is described below. The present invention, however, is not limited thereto.

When the reaction system is a reaction system containing the aqueous phase, for example, the aqueous phase may contain a source of the compound radical, and the compound radical may be generated from the source of the compound radical in the compound radical generating step. The aqueous phase is, for example, a phase of an aqueous solvent containing the source of the compound radical, and the aqueous solvent is the same as described above. When the compound radical generated in the aqueous phase is hydrophobic, for example, the compound radical can be transferred to the organic phase by using a two-phase reaction system containing the organic phase and the aqueous phase as the reaction system for radical generation. As described above, when the pretreatment step is performed in the gas-phase reaction system, the reaction system for generating the compound radical may be, for example, only an aqueous phase or a two-phase reaction system of an aqueous phase and an organic phase. In the case where the compound radical is hydrophobic, for example, since the compound radical generated in the aqueous phase can be directly transferred to the gas phase, the reaction system for radical generation may be only the aqueous phase.

The source of the compound radical is not particularly limited, and can be appropriately selected depending on, for example, the type of the compound radical. As the source of the compound radical, for example, only one type may be used, or two or more of types may be used in combination.

When the compound radical is a radical containing the Group 16 element and the Group 17 element, the compound radical may be, for example, an oxide radical of the halogen. In this case, the source may be, for example, a compound containing the Group 16 element and the Group 17 element corresponding to the compound radical. Specifically, the source may be, for example, halous acid ($HXO_2$) or salt thereof. The salt of the halous acid is not particularly limited, and may be, for example, metal salt. Examples of the metal salt include alkali metal salt, alkaline earth metal salt, and rare earth salt. When the compound radical is the chlorine dioxide radical, the source is not particularly limited, and may be, for example, chlorite ($HClO_2$) or salt thereof. Specifically, examples of the source include sodium chlorite ($NaClO_2$), lithium chlorite ($LiClO_2$), potassium chlorite ($KClO_2$), magnesium chlorite ($Mg(ClO_2)_2$), and calcium chlorite ($Ca(ClO_2)_2$). Among them, sodium chlorite ($NaClO_2$) is preferred from the viewpoint of cost and ease of handling. For example, the same method can be used for sources of other compound radicals. Specifically, examples of the sources of other compound radicals include bromate salt such as sodium bromite and iodite salt such as sodium iodite. Examples of other source include bromates such as sodium bromate and iodates such as sodium iodate. The source of the compound radical is not particularly limited and can be appropriately selected depending on, for example, the type of the compound radical. As the source of the compound radical, for example, only one type may be used, or two or more of types may be used in combination. Hereinafter, the present invention will be described with reference to an example in which the compound radical is a halogen oxide. However, the invention is not limited thereto.

The concentration of the source in the aqueous phase is not particularly limited. When the source is the compound, in terms of the compound ion concentration, the lower limit of the concentration thereof is 0.0001 mol/L or more and the upper limit thereof is 1 mol/L or less, for example, and, in terms of the number of moles of the compound ion, the lower limit of the concentration thereof is $1/100000$ times or more of the number of moles of the raw material and the upper limit of the concentration thereof is 1000 times or less of the number of moles of the raw material, for example. When the source is halous acid or halite (e.g., chlorous acid or chlorite), in terms of a halite ion (e.g., chlorite ion ($ClO_2^-$)) concentration, the lower limit of the concentration thereof is 0.0001 mol/L or more and the upper limit of the concentration thereof is 1 mol/L or less, for example, and in terms of the number of moles of the halite ion (e.g., chlorite ion ($ClO_2^-$)), the lower limit of the concentration thereof is $1/100000$ times or more of the number of moles of the raw material and the upper limit of the concentration thereof is 1000 times or less of the number of moles of the raw material, for example. The above-described concentrations can be applied also to other sources, for example.

The aqueous phase may further contain, for example, at least one of a Lewis acid and a Brønsted acid. The aqueous phase may contain, for example, only one or both of the Lewis acid and the Brønsted acid, or one substance may serve as both of the Lewis acid and the Brønsted acid. Only one type of the Lewis acid and the Brønsted acid may be used, or two or more types may be used in combination. In the present invention, the "Lewis acid" means, for example, a substance which serves as a Lewis acid with respect to the source of the compound radical.

In the aqueous phase, the concentration of at least one of the Lewis acid and the Brønsted acid is not particularly limited, and can be appropriately determined depending on, for example, the type of the polymer to be modified. The lower limit of the concentration is 0.0001 mol/L or more and the upper limit of the concentration is 1 mol/L or less, for example.

The Lewis acid is not particularly limited, and may be, for example, an organic substance or an inorganic substance. Examples of the organic material include ammonium ions and organic acids (e.g., carboxylic acid). The inorganic substance may include one or both of metal ions and nonmetal ions. The metal ion may include one or both of typical metal ions and transition metal ions. Examples of the inorganic substance include alkaline earth metal ions (e.g., $Ca^{2+}$), rare earth metal ions, $Mg^{2+}$, $Sc^{3+}$, $Li^+$, $Fe^{2+}$, $Fe^{3+}$, $Al^{3+}$, silicate ions, and borate ions, and any one type of or two or more types of them may be used. Examples of the alkali earth metal ion include ions of calcium, strontium, barium, and radium. More specifically, examples of the alkali earth metal ion include $Ca^{2+}$, $Sr^{2+}$, $Ba^{2+}$, and $Ra^{2+}$. Furthermore the "rare earth metal" is a generic name of a set of seventeen elements, specifically, two elements such as scandium$_{21}$Sc and yttrium$_{39}$Y and fifteen elements (lanthanoids) from lanthanum$_{57}$La to lutetium$_{71}$Lu. Examples of the rare earth ion include trivalent cations corresponding the seventeen elements. The counter ion of the Lewis acid is not particularly limited and examples thereof include a trifluoromethanesulfonate ion (also referred to as "$CF_3SO_3^-$" or "OTf"), a trifluoroacetate ion ($CF_3COO^-$), an acetate ion, a fluoride ion, a chloride ion, a bromide ion, an iodide ion, a sulfate ion, a hydrogen sulfate ion, a sulfite ion, a nitrate ion, a nitrite ion, a phosphate ion, and a phosphite ion. For example, the Lewis acid may be scandium triflate (Sc(OTf)$_3$).

Examples of the Lewis acid (including counter ions) include $AlCl_3$, $AlMeCl_2$, $AlMe_2Cl$, $BF_3$, $BPh_3$, $BMe_3$, $TiCl_4$, $SiF_4$, and $SiCl_4$, and any one type of or two or more types of them may be used. It is to be noted that the "Ph" indicates a phenyl group and the "Me" indicates a methyl group.

The Lewis acidity of the Lewis acid is not particularly limited, and is, for example, 0.4 eV or more. The upper limit of the Lewis acidity is not particularly limited and is, for example, 20 eV or less. It is to be noted that the Lewis acidity can be measured, for example, by the method described in Ohkubo, K.; Fukuzumi, S. Chem. Eur. J., 2000, 6, 4532, J. Am. Chem. Soc. 2002, 124, 10270-10271 or the method described in J. Org. Chem. 2003, 68, 4720-4726. Specifically, the Lewis acidity can be measured by the following method.

(Measurement Method of Lewis Acidity)

As to acetonitrile (MeCN) that contains cobalt tetraphenylporphyrin (CoTPP), saturated $O_2$, and an object whose Lewis acidity is to be measured (e.g., a cation of a metal or the like, represented by $M^{n+}$ in the following chemical reaction formula (1a)) in the following chemical reaction formula (1a), the change of the ultraviolet-visible absorption spectrum is measured at room temperature. On the basis of the obtained reaction rate constant ($k_{cat}$), the ΔE value (eV), which is an indicator of the Lewis acidity, can be calculated. The relatively higher the $k_{cat}$, the relatively stronger the Lewis acidity. Furthermore, the Lewis acidity of an organic compound can be estimated from the energy level of the lowest unoccupied molecular orbital (LUMO) calculated by the quantum chemical calculation, for example. Regarding the energy level, the higher the value at the positive side, the stronger the Lewis acidity.

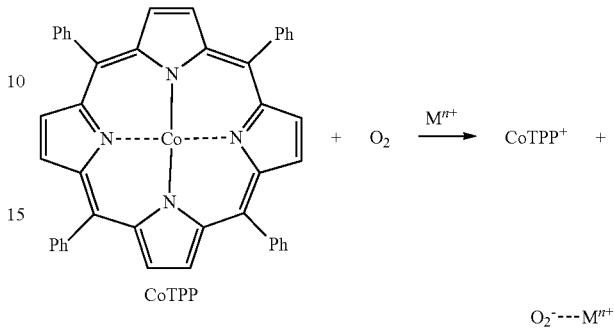

The Brønsted acid is not particularly limited, and may be, for example, an inorganic acid or an organic acid. Specific examples of the Brønsted acid include trifluoromethanesulfonic acid, trifluoroacetic acid, acetic acid, hydrofluoric acid, hydrochloric acid, hydrobromic acid, hydroiodic acid, sulfuric acid, sulfurous acid, nitric acid, nitrous acid, phosphoric acid, and phosphorous acid. The acid dissociation constant $pK_a$ of the Brønsted acid is, for example, 10 or less. The lower limit of the $pK_a$ is not particularly limited, and is, for example, −10 or more.

The aqueous phase contains, for example, the compound ion and a Brønsted acid, and is preferably, for example, an aqueous phase in which the compound and a Brønsted acid (e.g., hydrochloric acid) are dissolved in an aqueous solvent. As a specific example, when the compound radical is a chlorine dioxide radical, the aqueous phase preferably contains, for example, chlorite ion ($ClO_2^-$) and a Brønsted acid, and is preferably, for example, an aqueous phase in which the sodium chlorite ($NaClO_2$) and a Brønsted acid (e.g., hydrochloric acid) are dissolved in an aqueous solvent.

In the aqueous phase, for example, the Lewis acid, the Brønsted acid, the radical source, and the like may be dissolved or undissolved in the aqueous solvent. In the latter case, they may be dispersed or precipitated in the aqueous solvent, for example.

The aqueous phase is preferably in a state in which oxygen ($O_2$) is dissolved, for example. The timing of dissolving the oxygen ($O_2$) in the aqueous phase is not particularly limited, and may be, for example, before or after the generation of the compound radicals, or may be before or during the pretreatment step. As a specific example, oxygen may be dissolved by blowing air or oxygen gas into at least one of the aqueous phase and the organic phase before or after adding the source of the compound radical, the Lewis acid, the Brønsted acid, or the like. At least one of the aqueous phase and the organic phase may be saturated with oxygen ($O_2$), for example. When at least one of the aqueous phase and the organic phase contains oxygen, for example, modification of the polymer can be further accelerated in the pretreatment step.

The compound radical generating step is not particularly limited, and for example, the compound radical (e.g., chlorine dioxide radical) can be naturally generated from the compound ion (e.g., chlorite ion) by causing the aqueous solvent to contain the source of the compound radical. For example, it is preferable that the source be dissolved in the aqueous solvent in the aqueous phase, and it is preferable that the aqueous phase be left to stand still. In the compound radical generating step, the aqueous phase can further accelerate the generation of the compound radical by, for example, causing at least one of the Lewis acid and the Brønsted acid to coexist. In the compound radical generating step, the compound radical can be generated, for example, by irradiating the aqueous phase with light. It is to be noted that the compound radical can also be generated, for example, by simply causing the aqueous phase to stand still without irradiating the aqueous phase with light. Since the compound radical generated from the source in the aqueous phase in the reaction system is poorly soluble in water, it is dissolved in the organic phase in the reaction system.

The mechanism by which the compound radical is generated from the compound ion in the aqueous phase is presumed, for example, as in the scheme 1 below. In the following scheme, chlorite ion as the compound ion and chlorine dioxide radical as the compound radical are given as specific examples. The scheme 1 below is an example of a presumed mechanism and does not limit the present invention in any way. The first (uppermost) reaction formula in the scheme 1 below shows a disproportionation reaction of chlorite ion ($ClO_2^-$), and it is considered that the presence of at least one of a Lewis acid and a Brønsted acid in an aqueous phase facilitates the movement of the equilibrium to the right. The second (middle) reaction formula in the scheme 1 below shows a dimerization reaction, and hypochlorite ion ($ClO^-$) generated in the first reaction formula reacts with chlorite ion to generate dichlorine dioxide ($Cl_2O_2$). It is considered that the greater the protons $H^+$ in an aqueous phase, i.e., the more acidic, the easier the process is to proceed. The third (lowermost) reaction formula in the scheme 1 below shows radical generation. In this reaction, the dichlorine dioxide generated in the second reaction formula reacts with a chlorite ion to produce a chlorine dioxide radical.

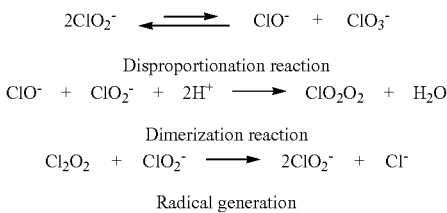

Scheme 1

$$2ClO_2^- \rightleftharpoons ClO^- + ClO_3^-$$

Disproportionation reaction $$ClO^- + ClO_2^- + 2H^+ \longrightarrow Cl_2O_2 + H_2O$$

Dimerization reaction $$Cl_2O_2 + ClO_2^- \longrightarrow 2ClO_2^\cdot + Cl^-$$

Radical generation

When the reaction system is the liquid-phase reaction system and is a two-phase reaction system containing the organic phase and the aqueous phase, after generating the compound radical as described above, the liquid-phase reaction system may be directly subjected to the above-described pretreatment step. That is, the pretreatment step of modifying the polymer molded body may be performed by further irradiating the liquid-phase reaction system in which the compound radical is generated with light. In this case, for example, by irradiating the liquid-phase reaction system with light, the compound radical generating step and the pretreatment step can be performed successively. In the present invention, for example, better reaction efficiency can be obtained by performing the compound radical generating step and the pretreatment step in the two-phase reaction system.

On the other hand, when the reaction system in the pretreatment step is the liquid-phase reaction system and is a one-phase reaction system containing only the organic phase, for example, the compound radical may be generated in the aqueous phase by the above-described method and the generated compound radical may be dissolved (extracted) in the organic phase, and then the aqueous phase may be removed and the organic phase containing the compound radical may be subjected to the pretreatment step as the one-phase reaction system.

Figure 2:
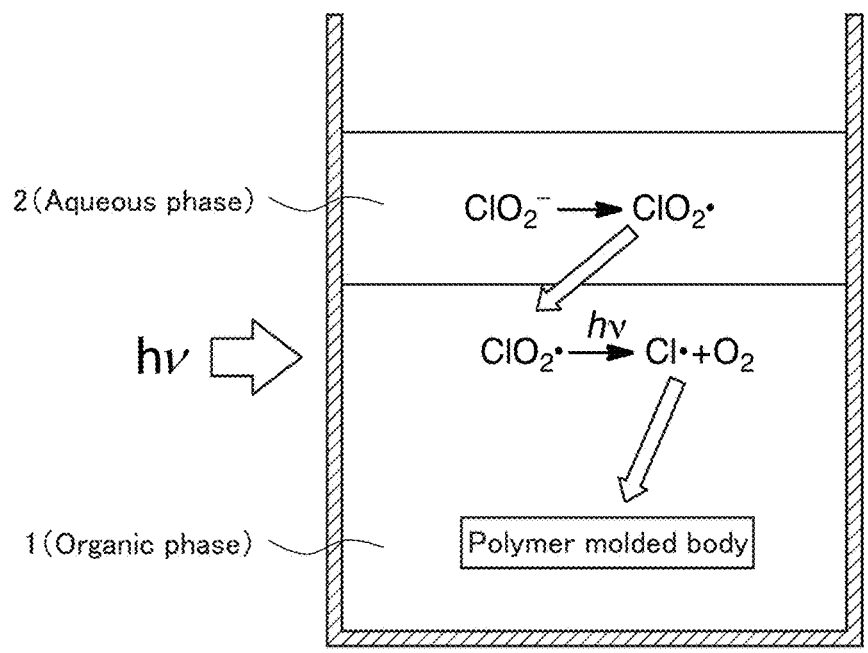
FIG. 2 is a diagram schematically showing an example of the pretreatment step in the target molecule binding method of the present invention.

FIG. 2 schematically shows an example of the compound radical generating step and the pretreatment step using the two-phase reaction system. In FIG. 2, the chlorine dioxide radical as the compound radical and the molded body as the polymer are shown as specific examples, however, the present invention is not limited in any way to these examples. In FIG. 2, the masking member is not shown. As shown in FIG. 2, in the reaction system, two layers of an aqueous layer (the aqueous phase) and an organic layer (the organic phase) are separated from each other in a reaction vessel, and are in contact with each other only at an interface. The upper layer is an aqueous layer (the aqueous phase) 2, and the lower layer is an organic layer (the organic phase) 1. It is to be noted that, while FIG. 2 is a cross-sectional view, for viewability, hatching of the aqueous layer 2 and organic layer 1 is omitted. As shown in FIG. 2, chlorite ion ($ClO_2^-$) in the aqueous layer (aqueous phase) 2 reacts with an acid to generate a chlorine dioxide radical ($ClO_2^\cdot$). Since the chlorine dioxide radical ($ClO_2^\cdot$) is poorly soluble in water, it is dissolved in the organic phase 1. Subsequently, by irradiating the organic layer 1 containing the chlorine dioxide radical ($ClO_2^\cdot$) with light and applying light energy hv (h denotes the Planck constant and v denotes the light frequency) to the organic layer, a chlorine dioxide radical ($ClO_2^\cdot$) in the organic layer 1 is decomposed to generate a chlorine radical ($Cl^\cdot$) and an oxygen molecule ($O_2$). As a result, the polymer molded body in the organic layer (organic phase) 1 is oxidized and the surface is modified. FIG. 2 is merely an illustrative example and does not limit the present invention in any way.

In FIG. 2, while the aqueous layer 2 is the upper layer and the organic layer 1 is the lower layer, for example, if the organic layer 1 has lower density (specific gravity) than the aqueous layer 2, the organic layer 1 serves as the upper layer. The polymer molded body may be immobilized in the reaction vessel such that the polymer molded body is disposed in the upper organic layer. In this case, the site where the polymer molded body is immobilized may be provided in the reaction vessel or may be provided outside the reaction vessel, for example. In the latter case, for example, the polymer molded body may be suspended from the outside and immersed in the organic layer.

While FIG. 2 shows the two-phase reaction system, in the producing method of the present invention, the pretreatment step may be performed in a one-phase reaction system containing only an organic phase. In this case, for example, an aqueous phase containing the source of the compound radical is separately prepared, the compound radical is generated in the aqueous phase, and then the organic phase is mixed with the aqueous phase to dissolve (extract) the compound radical generated in the aqueous phase into the organic phase. Then, the aqueous phase and the organic phase are separated, the organic phase is recovered, and the polymer molded body is disposed, thereby obtaining a one-phase reaction system. The pretreatment step is performed by selectively irradiating the one-phase reaction system alone with light in the presence of the compound radical.

(8) Target Molecule-Bound Polymer Molded Body and Production Method of the Same

The method for producing a target molecule-bound polymer molded body of the present invention is characterized in that it includes a binding step of binding a target molecule to a polymer molded body, and the binding method in the binding step is the binding method of the present invention. According to the production method of the present invention, by using the target molecule binding method of the present invention, a target molecule-bound polymer molded body in which the target molecule is selectively bound to the polymer molded body can be obtained.

According to the present invention, by selecting the target molecule to be bound according to the purpose, it is possible to obtain the target molecule-bound polymer molded body appropriate for the purpose. The field of use of the target molecule-bound polymer molded body obtained by the present invention is not particularly limited, and examples thereof include the field of regenerative medicine and the field of cell culture. In the field of cell culture, for example, culture components of cells such as iPS cells can be given. In the fields of medicine, biotechnology, biomaterials, and the like, for example, delivery materials, release materials, ion-permeable membranes, and the like can be given. Besides these, examples of the field of use of the target molecule-bound polymer molded body include optical fields including organic electroluminescence (EL), cameras, movies, players such as CDs or DVDs, televisions such as projection televisions, contact lenses, eyeglasses, cells such as blood analysis cells, and covers such as LED lenses. In addition, the field may be the field of regenerative medicine, for example.

Specific examples of the binding form of the target molecule to the polymer molded body after the pretreatments are described below. However, the present invention is not limited thereto.

(i) Polyion Complex Formation

According to the present invention, the modified functional group on the selected surface of the polymer molded body may be an oxygen modified functional group such as a hydroxy group and a carboxy group. In this case, in the polymer molded body after the pretreatments, since the selected surface becomes anion (−), it is possible to form a polyion complex by electric charge on the selected surface of the polymer molded body after the pretreatments simply by bringing a hydrophilic polymer having cations into contact with the selected surface, for example. Although it has been difficult to selectively hydrophilize the surface of the polymer molded body, according to the present invention, the selective hydrophilization can be easily performed simply by bringing the hydrophilic polymer which is the target molecule into contact with the selected surface after the pretreatments.

As a specific example, for example, the selected surface of the polymer molded body is subjected to the pretreatment step to oxidize the selected surface, and then the polymer molded body after the pretreatments is immersed in a cationic polymer aqueous solution. After immersion, the polymer molded body is washed with water and dried to obtain the target molecule-bound polymer molded body in which the cationic polymer is bound to the selected surface. The polymer molded body may be, for example, a polypropylene (PP) molded body or the like, and the cationic polymer may be, for example, polyethyleneimine or the like, and the molecular weight thereof may be, for example, 10,000. The concentration of the cationic polymer aqueous solution is, for example, 0.1% (w/v), and it is preferable to use ultrasonic treatments for, for example, 5 minutes at the time of immersion. As described above, by subjecting the polymer molded body to the pretreatment step and further performing the binding treatments of the cationic polymer, the hydrophilicity of the selected surface of the polymer molded body can be improved. By such hydrophilization, for example, the target molecule-bound polymer molded body can also be used in the fields of separators of batteries, diapers, and the like, for example.

(ii) Amine Coupling

According to the present invention, the modified functional group on the selected surface of the polymer molded body may be an oxygen modified functional group such as a carboxy group. Therefore, an amine can be coupled by bringing an amine compound into contact with the modified functional group. The amine compound ($R-NH_2$) is not particularly limited, and examples thereof include propargylamine, 3-azidopropylamine, amino acids, and undecafluorohexylamine serving as a raw material for fluorine-coating.

As a specific example, for example, the selected surface of the polymer molded body is subjected to the pretreatment step to oxidize the selected surface, the polymer molded body after the pretreatments is then introduced into a vessel, dichloromethane is added thereto, the resultant then is cooled to 0° C., and further an amine is added thereto. After stirring the resultant for 1 hour at room temperature, DCC (dicyclohexylcarbodiimide) is added and stirred at room temperature overnight. The polymer molded body after the treatments is washed with dichloromethane and dried to obtain the target molecule-bound polymer molded body in which an amine is introduced into the selected surface by coupling. The polymer molded body may be, for example, a polypropylene (PP) molded body or the like.

(iii) Nucleophilic Substitution Reaction

According to the present invention, the modified functional group on the selected surface of the polymer molded body may be an oxygen modified functional group such as an alcohol. Therefore, by bringing a target molecule exhibiting a nucleophilic substitution reaction into contact with the modified functional group, the target molecule can be bound. Examples of the target molecule ($R-X$) include tridecafluorohexyliodide and sodium bromoethanesulfonate.

As a specific example, for example, the selected surface of the polymer molded body is subjected to the pretreatment step to oxidize the selected surface, the polymer molded body after the pretreatments is then introduced into a vessel, and acetonitrile is added thereto. Then, a halide serving as a substrate and potassium carbonate are further added to the vessel, and the reaction is performed while stirring at 70° C. for 3 hours. The polymer molded body after the treatments is washed with ether and dried to obtain the target molecule-bound polymer molded body in which a group ($R-$) of a target molecule instead of H is bound to a hydroxy group of an alcohol on the selected surface. The polymer molded body may be, for example, a polypropylene (PP) molded body or the like.

In the present invention, the method of selectively binding the functional substance to the polymer molded body described above is also referred to as a first binding method of the present invention. The present invention is not limited to the first binding method, and may be, for example, a second binding method to be described below. The second binding method, i.e., a method of binding the target molecule to the polymer molded body, includes a pretreatment step of irradiating the surface of the polymer molded body with light in the presence of the compound radical, and a binding step of binding the target molecule to the surface of the polymer molded body by reacting the target molecule with the polymer molded body after the pretreatments, wherein the compound radical is a radical containing one element selected from the group consisting of Group 15 elements and Group 16 elements, and a Group 17 element. That is, in the second binding method, not only the surface of the polymer molded body is selectively irradiated with light but also the entire surface is irradiated with light in the pretreatment step for binding the target molecule to the polymer molded body. According to the second binding method, owing to the presence of the modified functional group by modification by the pretreatments, it becomes easier to bind the target molecule to the surface of the polymer molded body after the pretreatments as compared to the state where the pretreatment is not performed.

EXAMPLES

Next, examples of the present invention will be described. It is to be noted, however, that the present invention is by no means limited to the following examples.

Example 1

Toluidine blue was selectively bound to the surface of polypropylene (PP) plates.

Figure 13A:
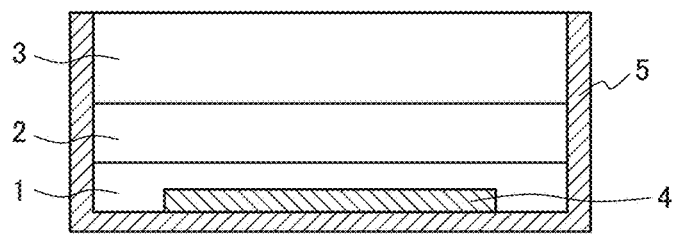
FIGS. 13A and 13B are schematic diagrams showing the plate and the reaction vessel in Example 1.

A transparent petri dish, which is a reaction vessel, was filled with 10 ml of fluorous solvent ($CF_3(CF_2)_4CF_3$), 20 ml of water ($H_2O$), 200 mg of sodium chlorite ($NaClO_2$), and 200 µl of 35% hydrochloric acid (HCl) and stirred for 5 minutes. The reaction vessel was allowed to stand to separate from the bottom into an organic phase, an aqueous phase, and a gas phase of the fluorous solvent. It was confirmed that $ClO_2$ radicals generated in the aqueous phase were transferred to the organic phase by checking the organic phase being colored yellow. Next, a PP plate (product number 2-9221-01 manufactured by AS ONE Corporation.) was introduced into the reaction vessel. The size of the PP plate was 50 mm in length, 30 mm in width, and 1 mm in thickness. FIG. 13A is a schematic diagram showing a state where the PP plate is placed in the reaction vessel. In the reaction vessel 5, the organic phase 1, the aqueous phase 2, and the gas phase 3 were separated in this order, and the PP plate 4 was immersed in the organic phase 1.

Figure 13B:
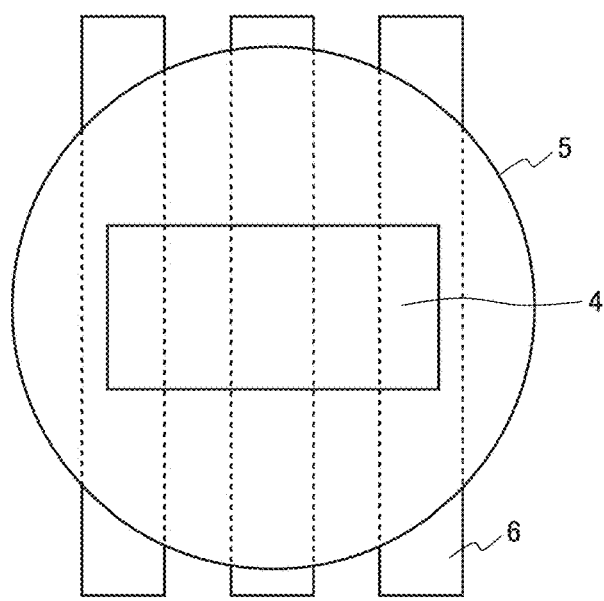

Then, a lid was placed on the upper portion of the reaction vessel. A light source was disposed below a transparent table so as to face upward, and three black rectangular papers as masking members were disposed on the transparent table at regular intervals. The reaction vessel was disposed on the masking member. FIG. 13B shows the positional relationship among the PP plate 4, the reaction vessel 5, and the masking member 6. FIG. 13B is a plan view of the reaction vessel 5 as seen from above. Light irradiation was performed from the light source below the transparent table toward the reaction vessel on the transparent table. Since the masking member is disposed under the reaction vessel, the lower surface of the PP plate in the reaction vessel is irradiated with light only at a site where the masking member is not disposed. The distance between the light source and the PP plate was 20 cm. As the light source, an LED lamp (Pi Photonics Inc.) with a wavelength of 365 nm was used. The light irradiation was performed under room temperature (about 25° C.) without pressurizing or depressurizing the reaction vessel in an atmosphere. Then, after 30 minutes from the initiation of light irradiation, the reaction was terminated by confirming the disappearance of the yellow coloration derived from $ClO_2$ radicals in the organic phase in the reaction vessel.

Next, 50 ml of 0.05% toluidine blue aqueous solution of the blue dyes was prepared, and then the PP plate that has been oxidized by $ClO_2$ radicals was placed. After sonication for 1 minute at room temperature, the PP plate was taken out and washed with water.

Figure 14:
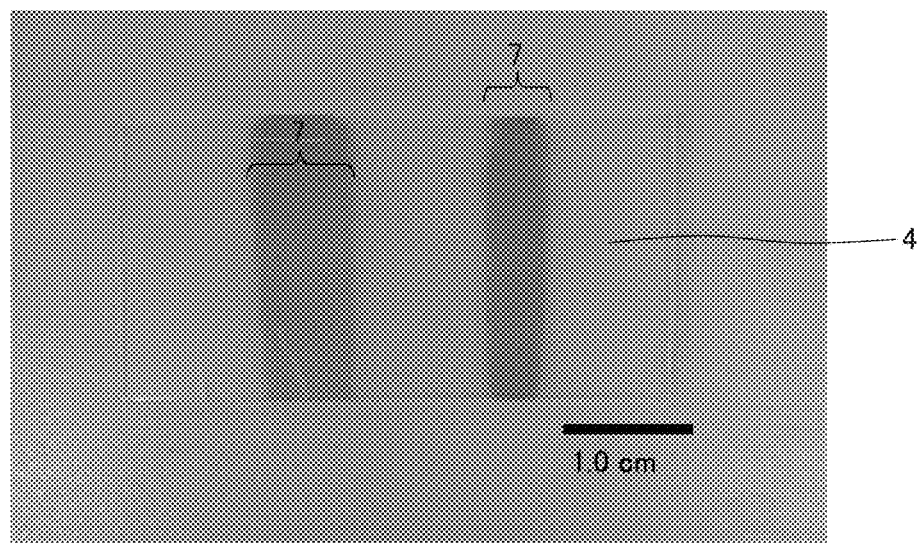
FIG. 14 is a photograph showing the coloring results in Example 1.

FIG. 14 shows a photograph of the obtained PP plate. As shown in FIG. 14, in the PP plate 4, it was observed that toluidine blue was bound only to a site 7 where the masking member was not disposed. Despite the fact that the toluidine blue aqueous solution was brought into contact with the entire surface of the PP plate, binding of toluidine blue was observed only in a region where the masking member was not disposed. This shows that, by selectively irradiating light by masking in the presence of $ClO_2$ radicals, only the region where the masking member was not disposed was oxidized.

Example 2

NBD was bound to the surface of polypropylene (PP) particles.

A transparent sample bottle, which is a reaction vessel, was filled with 2 ml of fluorous solvent ($CF_3(CF_2)_4CF_3$), 3 ml of water ($H_2O$), 100 mg of sodium chlorite ($NaClO_2$), and 20 µl of 35% hydrochloric acid (HCl) and stirred for 5 minutes. The reaction vessel was allowed to stand to separate from the bottom into an organic phase, an aqueous phase, and a gas phase of the fluorous solvent. Next, a PP particle (Mitsui Chemicals Inc.) was introduced into the reaction vessel. Then, a lid was placed on the upper portion of the reaction vessel, and light irradiation was performed from a light source toward the reaction vessel. The distance between the light source and the side surface of the reaction vessel was 25 cm. As the light source, an LED lamp (Pi Photonics, Inc) with a wavelength of 365 nm was used. The light irradiation was performed under room temperature (about 25° C.) without pressurizing or depressurizing the reaction vessel in an atmosphere. Then, after 15 minutes from the initiation of light irradiation, the reaction was terminated by confirming the disappearance of the yellow coloration derived from $ClO_2$ radicals in the organic phase in the reaction vessel.

Next, an acetonitrile solution (5 ml: solution A) of 10 mmol/L NBD-PZ of fluorescent molecules and a mixed acetonitrile solution (5 ml: solution B) containing 140 mmol/L 2, 2'-Dipyridyl Disulfide and triphenylphosphine (PPh3) were prepared, respectively. The PP particles were introduced into a mixed solution obtained by mixing equal amounts of the solution A and the solution B. After sonication for 1 minute at room temperature, the PP particles were taken out by filtration and washed in the order of acetonitrile and acetone. As a reference example, the same PP particles were not irradiated with light (pretreatments) in the presence of a $ClO_2$ radical, but treated with a fluorescent molecule NBD-PZ in the same manner.

Figures 15A, 15B:
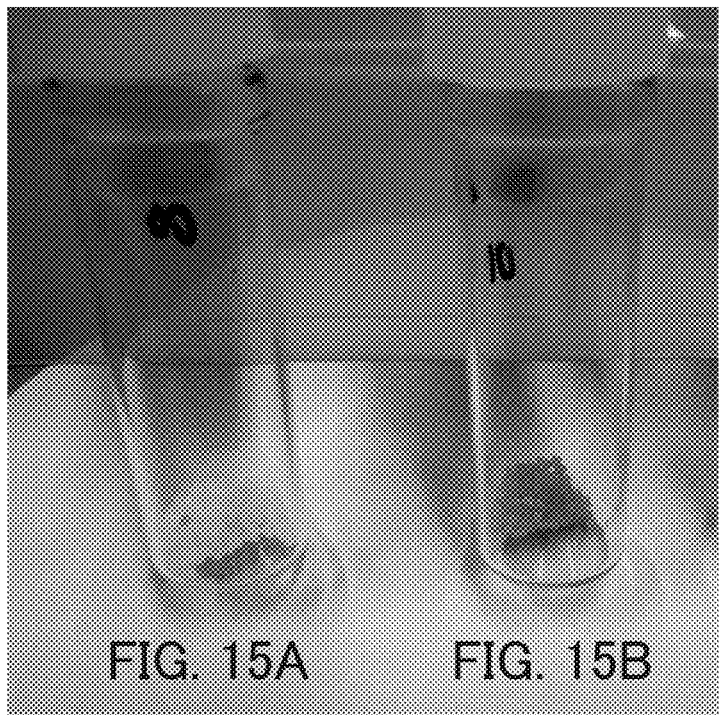
FIG. 15 is a photograph showing the coloring results in Example 2.

FIG. 15 shows a photograph of the obtained PP particles. In FIG. 15, (A) shows PP particles of a reference example that had not been subjected to the pretreatments and (B) shows PP particles that has been subjected to the pretreatments and fluorescent molecule treatments. The PP particles that had not been subjected to the pretreatments were white, whereas the PP particles that has been subjected to the pretreatments exhibited an orange color. While the PP particles of the both cases were subjected to the fluorescent molecule treatments, only the PP particles that has been subjected to the pretreatments exhibited an orange color, which indicates that the PP particles were oxidized by the pretreatments and thereby could bond to the fluorescent molecule.

Example 3

Brilliant green or crystal violet was bound to the surface of a polypropylene (PP) film.

The pretreatments by light irradiation in the presence of the $ClO_2$ radical were performed in the same manner as in Example 1 except that a PP film (product number 2-9221-01 manufactured by AS ONE Corporation.) having a size of 40 mm (length)×30 mm (width)×1 mm (thickness) was used and the masking member was not used.

The treatments were performed in the same manner as in Example 1, except that a 1% brilliant green aqueous solution of the dye (5 ml) or a 1% crystal violet aqueous solution of the dye was used instead of a 0.05% toluidine blue aqueous solution.

Figure 16:
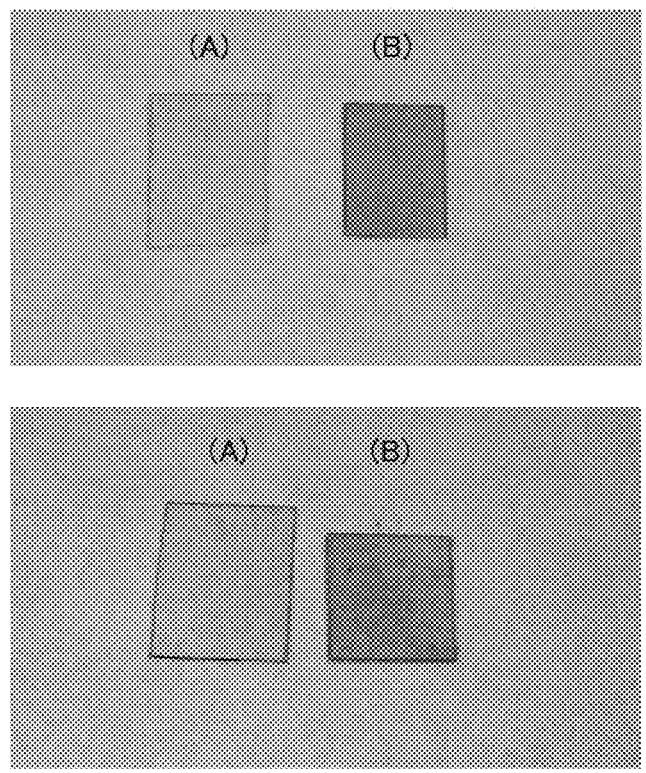
FIG. 16 shows photographs showing the coloring results in Example 3.

FIG. 16 shows photographs of the obtained PP films. In FIG. 16, the upper photograph shows the result of the treatments with brilliant green and the lower photograph shows the result of the treatments with crystal violet. In each of the photographs of FIG. 16, (A) shows the PP film of a reference example that had not been subjected to the pretreatments and (B) shows the PP film that has been subjected to the pretreatments and the dye treatments. The PP film that had not been subjected to the pretreatments was nearly transparent, whereas the PP film that has been subjected to the pretreatments exhibited a green color in the case of brilliant green and a pink color in the case of crystal violet. While the PP particles of the both cases have been subjected to the dye treatments, only the PP particles that have been subjected to the pretreatments exhibited a color, which indicates that the PP particles were oxidized by the pretreatments and thereby could bound to the dye.

Example 4

Toluidine blue was bound to the surface of a substantially cylindrical body of high-density polyethylene (PE).

The pretreatments were performed in the same manner as in Example 2 except that a substantially cylindrical body of high-density polyethylene pellet was used instead of the PP particles. Then, the pretreatments were performed in the same manner as in Example 1 except that 50 ml of mixed aqueous solution of 50 mmol/L NaOH and 5% toluidine blue was used.

Figures 17A, 17B:
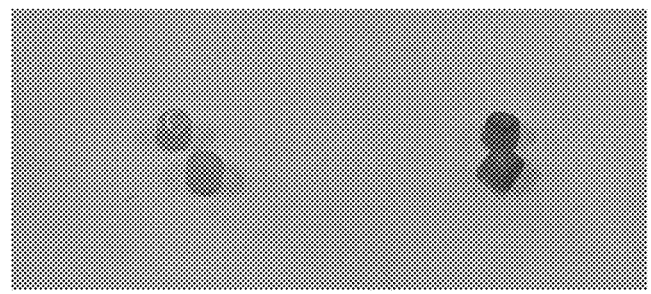
FIG. 17 is a photograph showing the coloring results in Example 4.

FIG. 17 shows a photograph of the obtained substantially cylindrical bodies. In FIG. 17, (A) shows the substantially cylindrical bodies of a reference example that had not been subjected to the pretreatments and (B) shows the substantially cylindrical bodies that has been subjected to the pretreatments and the dye treatments. The substantially cylindrical body that had not been subjected to the pretreatments exhibited a white turbidity color, whereas the PE pellet that has been subjected to the pretreatments exhibited a purple color. While the substantially cylindrical bodies of the both cases have been subjected to the dye treatments, only the substantially cylindrical bodies that has been subjected to the pretreatments exhibited a color, which indicates that the substantially cylindrical bodies were oxidized by the pretreatments and thereby could bound to the dye.

Example 5

Rhodamine 6G was selectively bound to the surface of a polypropylene (PP) plate.

The pretreatments were performed in the same manner as in Example 1 except that a PP plate (product number 2-9221-01 manufactured by AS ONE Corporation.) having a size of 30 mm (length)×30 mm (width)×1 mm (thickness) was used and black paper cut out of the Osaka University school emblem with a ginkgo motif as the masking member was used under a petri dish which is a reaction vessel.

The PP film was subjected to the binding treatments in the same manner as in Example 1 except that a 5% rhodamine 6G aqueous solution (20 ml) was used instead of the toluidine blue aqueous solution. Then, the coloring of the PP plate under natural light and generation of fluorescence by excitation light (365 nm) irradiation under dark conditions were examined.

Figure 18A:
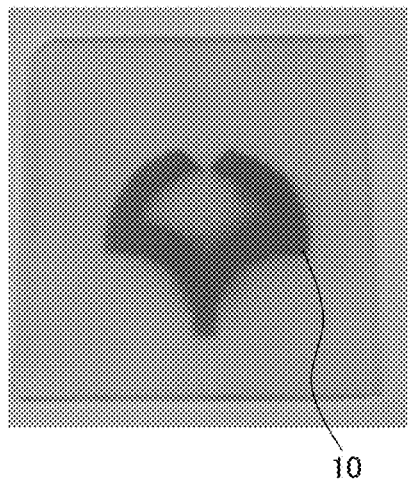
FIG. 18 shows photographs showing the coloring results in Example 5.
Figure 18B:
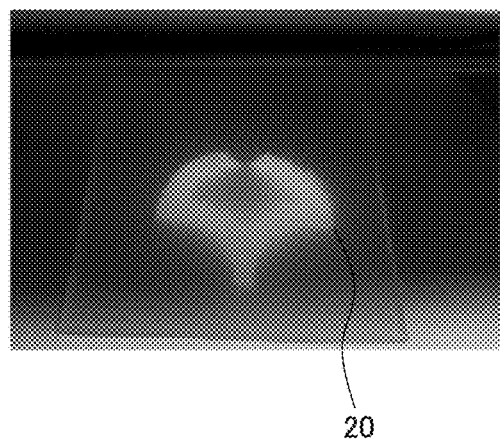

FIG. 18 shows these results. In FIG. 18, (A) shows a photograph of the PP plate under natural light and (B) shows a photograph of the PP plate under excitation light irradiation. As shown in (A) of FIG. 18, the motif exhibited a pink color in the transparent PP plate. As shown in (B) of FIG. 18, the motif exhibited orange fluorescence by excitation light irradiation in the PP plate. Despite the fact that the rhodamine 6G aqueous solution was brought into contact with the entire surface of the PP plate, binding of rhodamine 6G was observed only in the region of the cutout motif in the masking member. This shows that, by selectively irradiating light by masking in the presence of the $ClO_2$ radical, only the region where the masking member was not disposed was oxidized.

Example 6

After performing the pretreatments of the PP plate, succinimide was introduced as a linker molecule, and the protein was further bound thereto.

The pretreatment was performed in the same manner as in Example 1 except that a PP plate (product number 2-9221-01 manufactured by AS ONE Corporation.) was used and the masking member was not used. By this pretreatments, the introduction of carbonyl and hydroxy groups into the PP side chains on the surface of the PP plate was observed by IR. The size of the PP plate was 30 mm in length, 30 mm in width, and 1 mm in thickness.

Succinimide was introduced into functional groups of the PP plate after the pretreatments using 1-(3-dimethylaminopropyl)-3-ethylcarbodiimide hydrochloride (EDC) and N-hydroxysuccinimide (NHS). For the introduction of succinimide, a commercially available kit used for the introduction of succinimide into a carboxylic group of the surface of a metallic substrate (Amine Coupling Kit, manufactured by Dojindo Laboratories). The reaction scheme of oxidized PP(PP_Ox), EDC, and NHS is shown below.

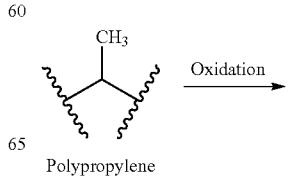

Polypropylene

33

-continued

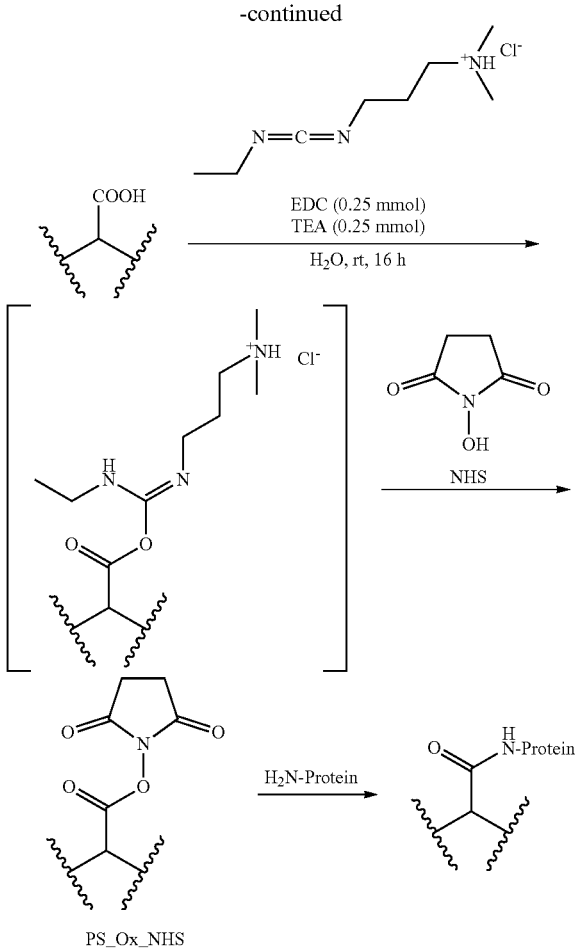

PS_Ox_NHS

Protein was reacted with the PP plate into which succinimide has been introduced to examine binding of the protein. Fluorescent substance-labeled albumin or cell adhesion factor fibronectin was used as the protein.

Fluorescent substance (FITC)-labeled albumin was bound to the PP-plate as follows. The labeled albumin was dissolved in 1×PBS with 0.05% Tween 200 so as to have a concentration of 20 µg/ml. 20 µl of this protein solution was added dropwise to a region of 0.05 cm² on the surface of the PP plate into which succinimide has been introduced. The PP plate was allowed to stand at room temperature for 2 hours, then washed with PBS, and the surface of the PP plate was observed with a fluorescence microscope.

Fibronectin was bound to the PP plate as follows. The fibronectin was dissolved in 1×PBS with 0.05% Tween 200 so as to have a concentration of 20 µg/ml. 20 µl of this protein solution was added dropwise to a region of 0.05 cm² on the surface of the PP plate into which succinimide has been introduced. The PP plate was allowed to stand at room temperature for 2 hours, and 50 µl of a PBS solution containing 1% skim milk was further added dropwise. The PP plate was allowed to stand at room temperature for 15 minutes, and then washed with PBS. Then, 20 µl of an anti-fibronectin antibody solution labeled with a fluorescent substance (ALEXA FLUOR 647) was added dropwise to the PP plate, and allowed to stand at room temperature for 2 hours. The anti-fibronectin antibody solution was prepared by dissolving the antibody in 1×PBS containing 0.05% Tween 20 so as to have a concentration of 10 µg/ml. The PP

34 plate was allowed to stand still, then washed with PBS, and the surface of the PP plate was observed with a fluorescence microscope.

As a result, the PP plate exhibited fluorescence. This shows that the labeled albumin was bound to the PP plate and that the fibronectin was bound to the PP plate.

Example 7

After performing the pretreatments of the PS (polystyrene) petri dish, succinimide was introduced as a linker molecule, and the protein was further bound thereto.

(1) Binding of Protein to Imidized PS Petri Dish after Pretreatments

The pretreatments were performed in the same manner as in Example 1 except that a PS petri dish (35 mm-diameter untreated dish, product number 3000-035, IWAKI, Inc.) was used and the masking member was not used. By this pretreatments, the introduction of the hydroxy group into the side chain of PS on the inner bottom surface of the PS petri dish was observed with XPS.

As to the PS petri dish after the pretreatments, the introduction of succinimide into the modified functional group by the pretreatments was performed using di(N-succinimidyl) carbonate (DSC) and triethylamine (TEA). The reaction scheme between oxidized PS (PS_Ox) and DSC is shown below.

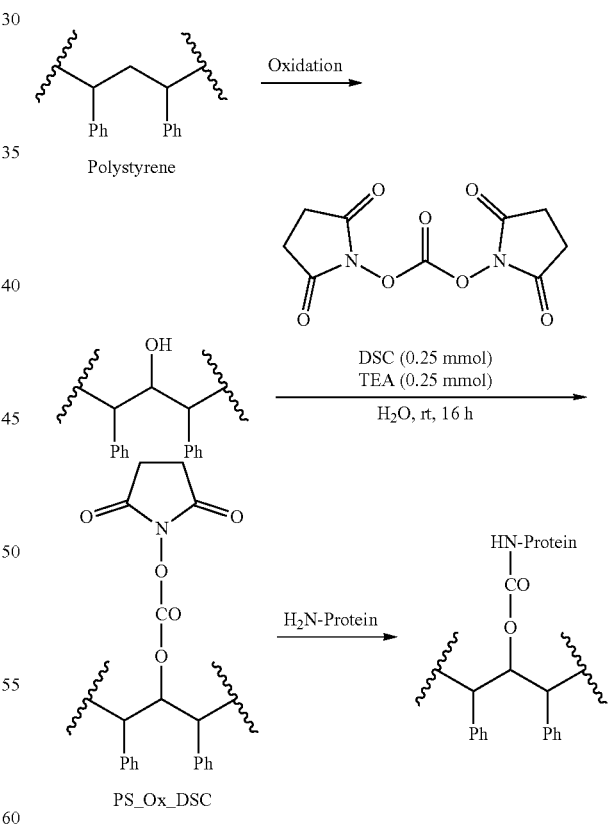

The fluorescent substance-labeled albumin or the cell adhesion factor fibronectin was reacted with the PS petri dish into which succinimide has been introduced in the same manner as in Example 6, and the binding thereof was examined with a fluorescence microscope. As a reference example, the PS petri dish that had not been subjected to the pretreatments was directly reacted with the protein and the PS petri dish that has been subjected to the pretreatments without being introduced with succinimide was reacted with protein, and the observation was performed with a fluorescence microscope in the same manner as described above.

As a result, the fluorescence was not observed in the PS petri dish that had not been subjected to the pretreatments and the PS petri dish that has been subjected to the pretreatments without being introduced with succinimide, whereas the fluorescence was observed in the region of the PS petri dish that has been subjected to the pretreatments and introduced with succinimide to which the protein has been applied. This result shows that the surface was modified by subjecting the PS petri dish to the pretreatments, and the protein can be bound by introducing succinimide into the modified region to be a linker.

(2) Binding of Protein to Epoxidized PS Petri Dish after Pretreatments

The pretreatments were performed in the same manner as in Example 1 except that a PS petri dish (35 mm-diameter untreated dish, product number 3000-035, IWAKI, Inc.) was used and the masking member was not used. By these pretreatments, the introduction of the hydroxy group in the side chain of PS on the inner bottom surface of the PS petri dish was observed with XPS.

As to the PS petri dish after the pretreatments, the epoxidation of the modified functional group by the pretreatments was performed using epichlorohydrin (EP) and sodium hydroxide (NaOH). The reaction scheme between oxidized PS (PS_Ox) and EP is shown below.

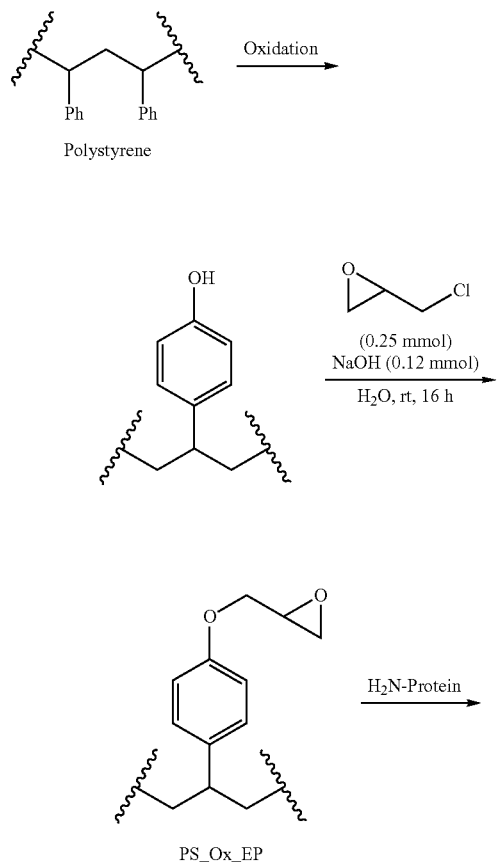

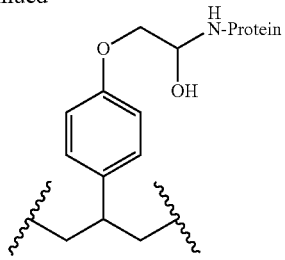

The fluorescent substance-labeled albumin or the cell adhesion factor fibronectin was reacted with the epoxidized PS petri dish in the same manner as in Example 6, and the binding thereof was examined with a fluorescence microscope. For detecting fibronectin, FITC was used as a fluorescent material. As a reference example, the PS petri dish that had not been subjected to the pretreatments was directly reacted with the protein and the PS petri dish that has been subjected to the pretreatments without being epoxidized was reacted with protein, and the observation was performed with a fluorescence microscope in the same manner as described above.

As a result, the fluorescence was not observed in the PS petri dish that had not been subjected to the pretreatments and the PS petri dish that has been subjected to the pretreatments without being epoxidized, whereas the fluorescence was observed in the region of the PS petri dish that has been subjected to the pretreatments and epoxidized to which the protein has been applied. This result shows that the surface was modified by subjecting the PS petri dish to the pretreatments, and the protein can be bound by epoxidizing the modified region to be a linker.

Example 8

After performing the pretreatments of the PP plate, an imide group was introduced as a first target molecule (linker molecule), and the protein was further bound thereto. Since the selective modification by using the masking member in the pretreatment step has been confirmed by Example 1 and the like, in the present example, the introduction of the imide group and the binding of the protein were examined without performing the selective light irradiation.

(1) Pretreatments

Figure 19:
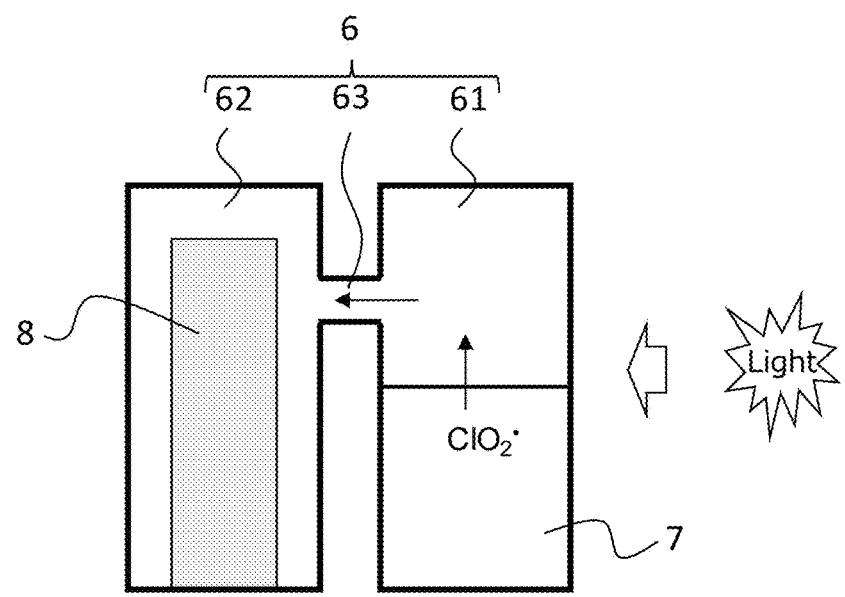
FIG. 19 is a cross-sectional view schematically showing a reaction system in Example 8.

The same PP plate as in Example 1 was used for the plate. A vessel 6 shown in FIG. 19 was prepared. The vessel 6 made of light-transmissive glass includes a first chamber 61, a second chamber 62, a flow path 63, and a lid (not shown), wherein the first chamber 61 and the second chamber 62 communicate with each other through the flow path 63. Then, a plate 8 (the PP plate) was accommodated in the second chamber 62, a mixing solution containing 20 ml of water ($H_2O$), 200 mg of carbonate ($NaClO_2$), and 200 μl of 35% chlorine acid (HCl), as a liquid-phase reaction system 7 for generating chlorine dioxide radical, was added to the first chamber 61, the lid was attached to the upper opening of the first chamber 61 and the second chamber 62, and the interior of the vessel 6 was sealed. The chlorine dioxide radical was generated from the liquid-phase reaction system in the first chamber 61 by being allowed to stand at room temperature for 15 minutes. Thereafter, the first chamber 61 was irradiated with light. As the light source of the light irradiation, an LED lamp (Pi Photonics, Inc) with a wavelength of 365 nm was used, and the distance between the light source and the first chamber 61 was 20 cm. The light irradiation was performed under room temperature (about 25° C.) without pressurizing or depressurizing the reaction vessel 6 in an atmosphere.

As a result of performing XPS on the PP plate after the pretreatments in the same manner as in Example B2 to be described below, it was confirmed that the proportion of oxygen atoms was improved and a carboxy group (—COOH) was introduced as an oxygen functional group in the same manner as in Example B2.

(2) Imidation

Figures 20A, 20B:
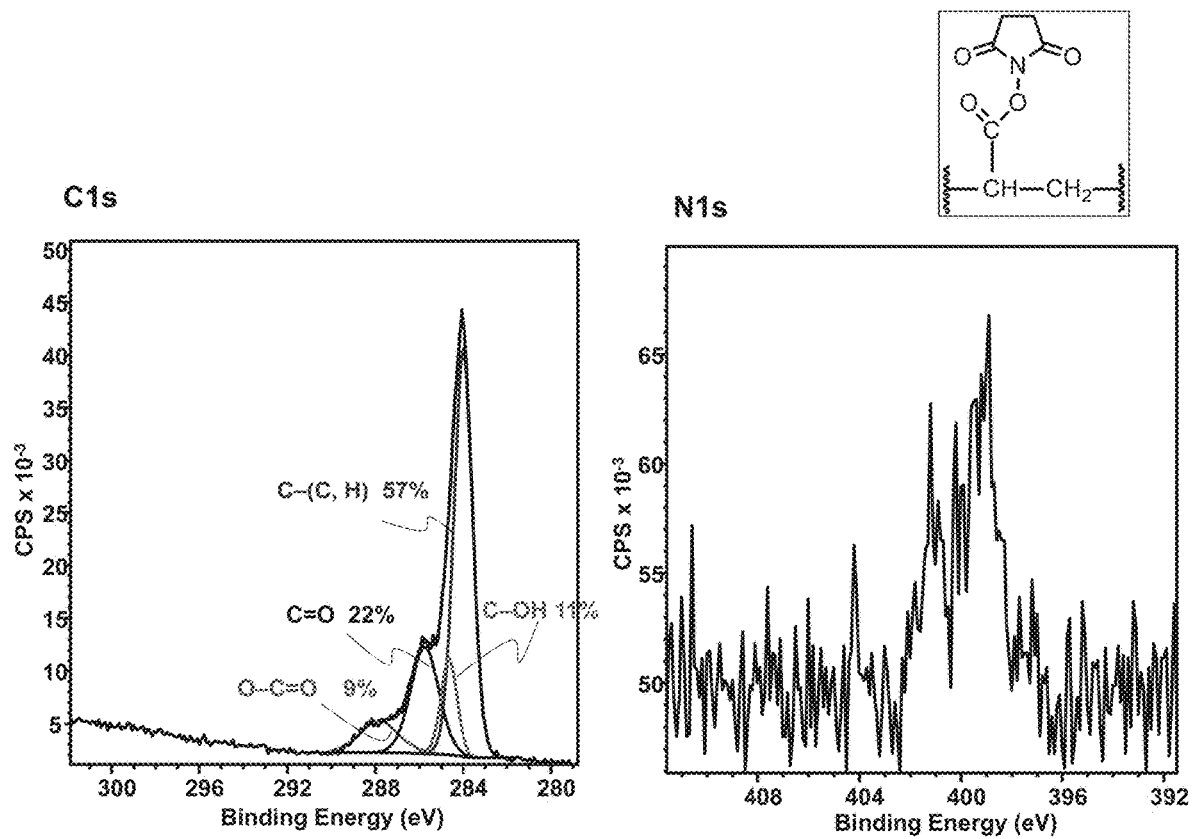
FIG. 20 shows graphs showing the results of XPS of Example 8.

The PP plate after the pretreatments was taken out from the vessel 6. Then, succinimide was introduced into the functional group of the PP plate after the pretreatments by using 1-(3-dimethylaminopropyl)-3-ethylcarbodiimide hydrochloride (EDC) and N-hydroxysuccinimide (NHS) in the same manner as in Example 6. The imidation reaction of the PP plate after the introduction treatments was examined by an XPS spectrum. The results thereof are shown in FIG. 20. FIG. 20 shows graphs showing the XPS spectrum of the PP plate. In FIG. 20, (A) shows the result of C1s and (B) shows the result of N1s. These results of FIG. 20 show that imide was introduced into the PP plate.

(3) Protein Binding

The fluorescent substance-labeled albumin or the cell adhesion factor fibronectin as protein was reacted with the imidized PP plate in the same manner as in Example 6, and the protein binding was examined. The method and condition for the binding treatments of the protein to the imide PP plate and the detection thereof were the same as in Example 6. As a result, the PP plate that has been subjected to the imide treatments exhibited fluorescence. This shows that the labeled albumin was bound to the PP plate after the imide treatments and that the fibronectin was bound to the PP plate.

Example 9

After performing the pretreatments of the PP plate, an imide group or an epoxy group was introduced as a first target molecule (linker molecule), and the protein was further bound thereto. Since the selective modification by using the masking member in the pretreatment step has been confirmed by Example 1 and the like, in the present example, the introduction of the imide group or the epoxy group and the binding of the protein were examined without performing the selective light irradiation.

(1) Pretreatments

The same PS petri dish as in Example 7 was used for the plate. Then, the pretreatments were performed using the vessel 6 shown in FIG. 19 in the same manner as in Example 8. The PS petri dish after the pretreatments was subjected to XPS in the same manner as in Example B2 to be described below. The results are shown in FIG. 21. In FIG. 8, (A1) show the result of wide-scan analysis (XPS_wide) by XPS for the PS petri dish before the pretreatments, (A2) shows the result of wide-scan analysis (XPS_wide) by XPS for the PS plate after the pretreatments, (B1) shows the result of narrow-scan analysis (XPS_C 1s) of carbon 1s by XPS for the PS dish before the pretreatments, and (B2) shows the result of narrow-scan analysis (XPS_C 1s) of carbon 1s by XPS for the PS dish after the pretreatments. As shown in FIG. 21, it was confirmed that the proportion of oxygen atoms was improved in the PS petri dish after the pretreatments in comparison with the PS petri dish before the pretreatments and the hydroxy group (—OH) was introduced as an oxygen functional group.

(2) Imidization and Epoxidation

Figures 22A, 22B:
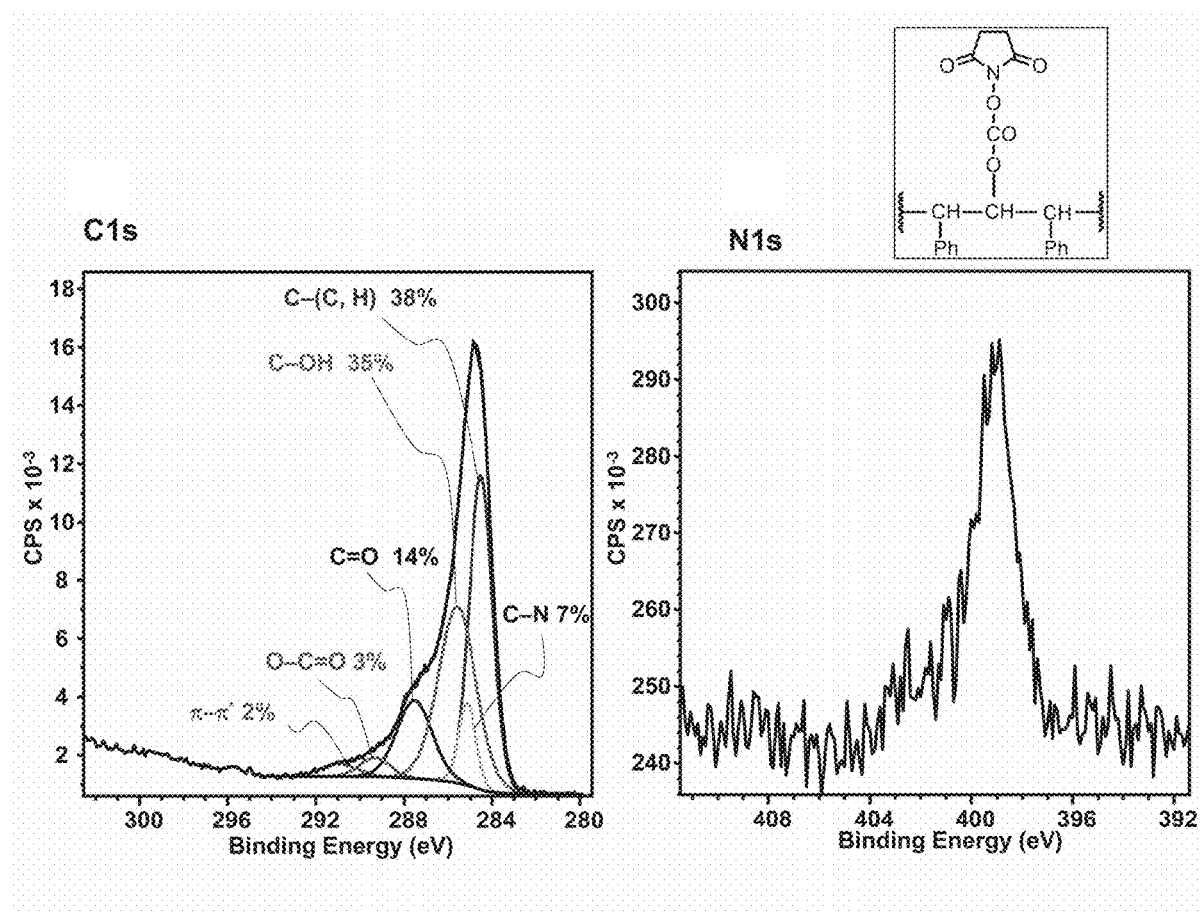
FIG. 22 shows graphs showing the results of XPS of Example 9.

The PS petri dish after the pretreatments was taken out from the vessel 6, and imidization and epoxidation were performed in the same manner as in Example 7. The imidized PS petri dish was subjected to XPS to examine the imidization. The results thereof are shown in FIG. 22. FIG. 22 shows graphs showing the XPS spectra of the PS petri dish. In FIG. 22, (A) shows the result of C1s and (B) shows the result of N1s. The results of FIG. 22 show that imide was introduced into the PP petri dish. As a result of performing phenolphthalein coloration on the PS petri dish subjected to epoxidation treatments, a coloration reaction was detected, and therefore, the introduction of an epoxy group was confirmed.

(3) Protein Binding

The fluorescent substance-labeled albumin or the cell adhesion factor fibronectin as protein was reacted with the imidized PS petri dish and the epoxidized PS petri dish in the same manner as in Example 6, and the protein binding was examined. The method and condition for the binding treatments of the protein to the petri dish and the detection thereof were the same as in Example 6. As a result, the imidized PS petri dish and the epoxidized PS petri dish exhibited fluorescence. This shows that the labeled albumin and the fibronectin were bound to the imidized PS petri dish and the epoxidized PS petri dish.

Example 10

After performing the pretreatments of a white polypropylene (PP) non-woven fabric (product name: oil absorbing pad, MonotaRO Co., Ltd., product number: MOEP2020), a metal complex molecule was bound as the first target molecule. Since the selective modification by using the masking member in the pretreatment step has been confirmed by Example 1 and the like, in the present example, the binding of the metal complex molecule was examined without performing the selective light irradiation.

The pretreatments of the PP non-woven fabric was performed in the same manner as in Example 8 except that the PP non-woven fabric was used instead of the PP plate, and further, as the metal complex, a cationic metal complex ruthenium tris-bipyridine complex (tris(2,2'-bipyridyl)ruthenium (II) chloridehexahydrate, Cas No.: 50525-27-4, Tokyo Kasei Kogyo Co., Ltd.), which is a dye molecule, was bound thereto. Specifically, the PP non-woven fabric after the pretreatments was immersed in a methanol solution containing the cationic metal complex at a concentration of 10 mmol/L, and reacted at room temperature for 60 minutes. After the reaction, the PP non-woven fabric was washed with methanol and dried naturally. As a comparative example, the metal complex molecule was reacted with the PP non-woven fabric that had not been subjected to the pretreatments in the same manner as described above.

As a result, the PP non-woven fabric that had not been subjected to the pretreatments was white even after washing with methanol, and the metal complex molecule was not bound. On the other hand, in the PP non-woven fabric that has been subjected to the pretreatments, a red color derived from the metal complex (ruthenium tris-bipyridine complex) remained in the PP non-woven fabric after washing with methanol, so that the binding of the metal complex molecule was confirmed.

Example 11

The binding of the target molecule (metal ion molecule) to the PP non-woven fabric was examined in the same manner as in Example 10 except that iron(II) ion (iron(II) chloride tetrahydrate, $FeCl_2 \cdot 4H_2O$, Cas No.: 13478-10-9, FUJIFILM Wako Pure Chemical Corporation) was used instead of the ruthenium tris-bipyridine complex. Specifically, the PP non-woven fabric after the pretreatments was immersed in an aqueous solution containing the iron(II) ion at a concentration of 10 mmol/L, and reacted at room temperature for 60 minutes. After the reaction, the PP non-woven fabric was washed with pure water and dried naturally. As a comparative example, the iron(II) ion was reacted with the PP non-woven fabric that had not been subjected to the pretreatments in the same manner as described above.

As a result, the PP non-woven fabric that had not been subjected to the pretreatments was white even after washing with pure water, and the metal ion molecule was not bound. On the other hand, in the PP non-woven fabric that has been subjected to the pretreatments, an orange color derived from the metal ion (iron(II) ion) remained in the PP non-woven fabric after washing with pure water, so that the binding of the metal ion molecule was confirmed.

In the following examples, it was examined that various polymers can be oxidized by pretreatments using a liquid-phase reaction system or a gas-phase reaction system.

Example A

As Example A, a treatment step using a liquid-phase reaction system was performed.

Example A1

A fluorous solvent ($CF_3(CF_2)_4CF_3$) was used as an organic phase. On the other hand, sodium chlorite ($NaClO_2$) as a source of the dioxide radical and HCl as an acid were dissolved in an aqueous solvent ($D_2O$, D is deuterium), and the obtained aqueous solution was saturated with oxygen gas ($O_2$), thereby preparing an aqueous phase. In the aqueous phase, the final concentration of sodium chlorite was 500 mmol/L, and the final concentration of HCl was 500 mmol/L. 25 mL of the aqueous phase and 25 mL of the organic phase were placed in the same reaction vessel and brought into contact to form a two-phase reaction system. In the two-phase reaction system, the fluorous solvent as the organic phase was a lower layer, and the aqueous phase was an upper layer. Then, a polypropylene film (manufactured by Kaneka Corporation) was put into the reaction vessel. The film was submerged in the organic phase of the lower layer. The size of the film was 20 mm in length, 20 mm in width, and 0.1 mm in thickness. Then, in the atmosphere, the two-phase reaction system was irradiated with light at room temperature (about 25° C.) for 3 hours with a xenon lamp (500 W, manufactured by USHIO INC., attached with Pyrex® glass filter) having a wavelength of λ>290 nm, without pressurizing or decompressing. The entire upper surface of the film in the organic phase was irradiated with light from the above of the organic phase.

Figure 3A:
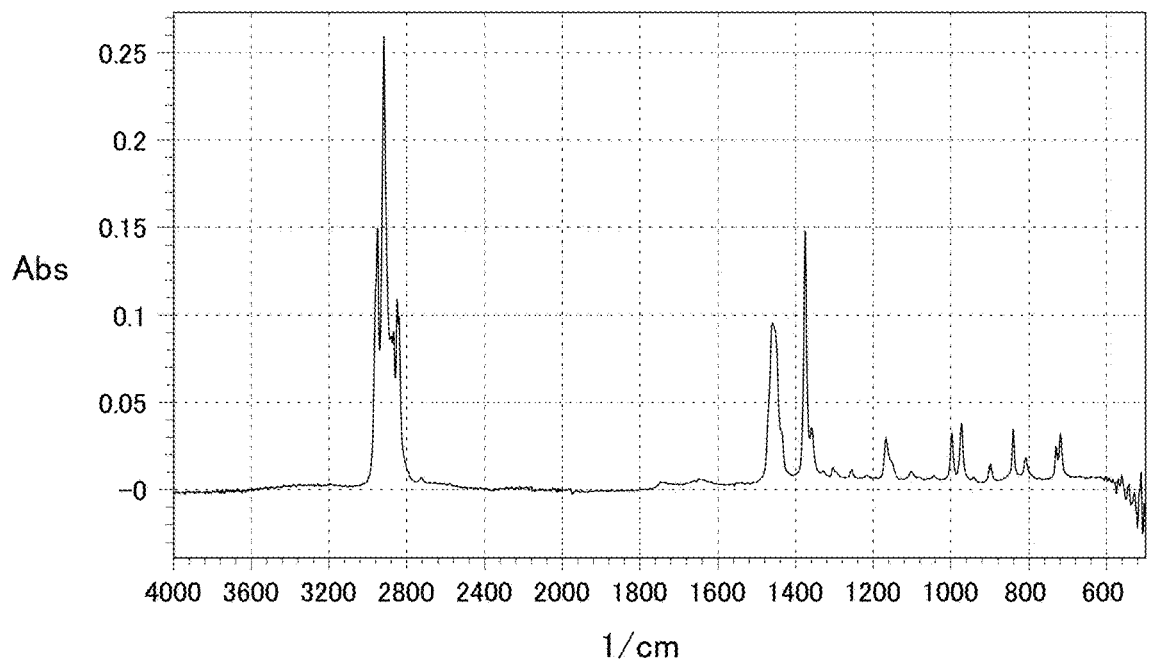
FIG. 3 shows graphs showing the results of IR of Example A1.
Figure 3B:
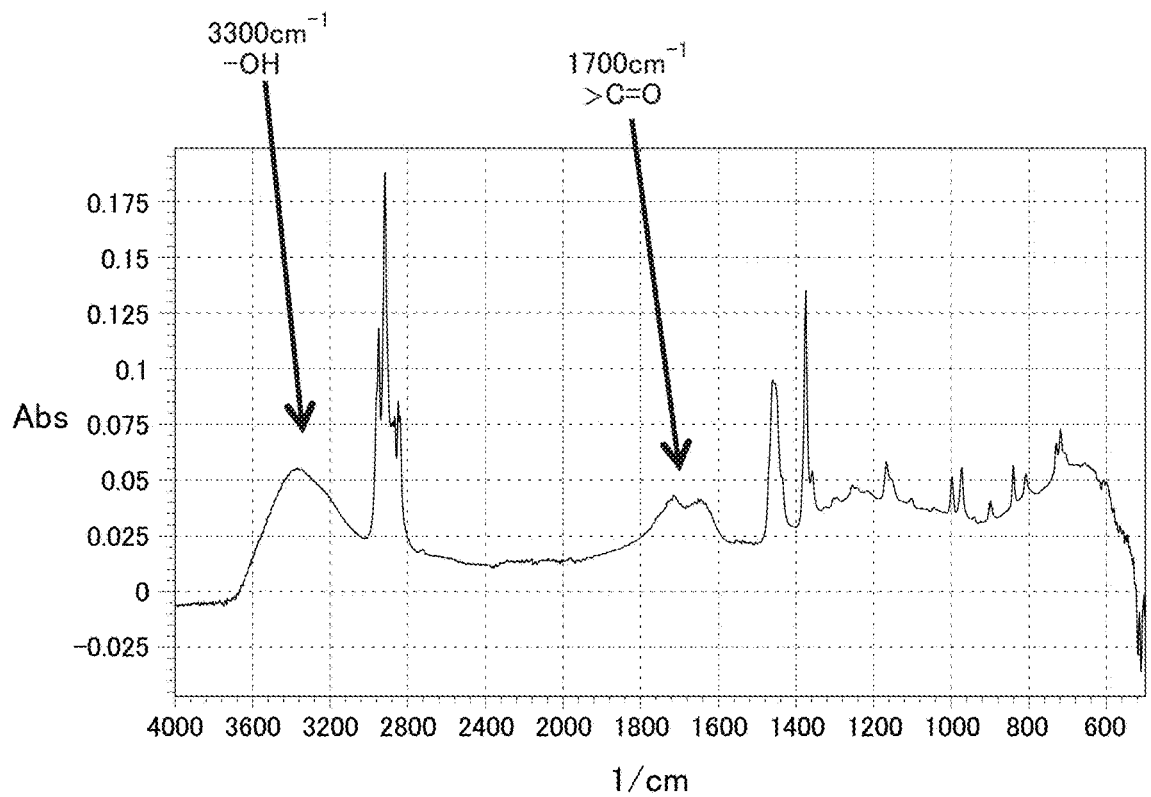

After the light irradiation, IR was performed on the surface of the film that has been irradiated with light. As a comparative example, the film was subjected to IR in advance in the same manner before being irradiated with light. The results are shown in FIG. 3. In FIG. 3, (A) shows the result before the light irradiation, and (B) shows the result after the light irradiation.

As shown in (B) of FIG. 3, owing to the light irradiation, a peak showing a hydroxy group (—OH) and a peak showing a carbonyl group (—C(=O)—) contained in a carboxy group (—COOH), which were not observed in (A) of FIG. 3 showing the result before the light irradiation, were observed. These results show that, in the polypropylene film, the methyl group of the side chain of the polymer was oxidized to a hydroxymethyl group (—$CH_2OH$) and a carboxy group (—COOH), and the surface of the film was modified. Since a methyl group is a group having extremely low reactivity among saturated hydrocarbon groups, it is obvious that oxidation of other saturated hydrocarbon groups (ethyl group, propyl group, phenyl group, etc.) is also possible.

Figure 4:
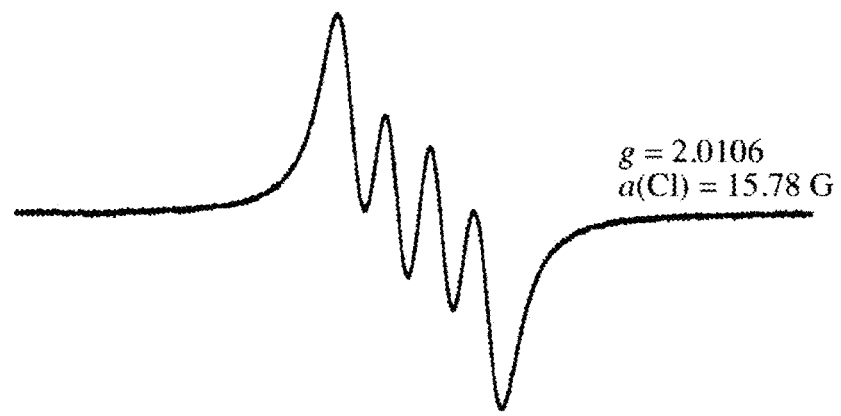
FIG. 4 is a graph showing the results of EPR indicating the generation of chlorine dioxide radicals in Example A1.

In Example 1, a chlorine dioxide radical was generated in a two-phase reaction system, and a polymer film was oxidized. The generation of the chlorine dioxide radical in the reaction system has been verified by EPR (Electron Spin Resonance). The results of the EPR are shown in FIG. 4.

Example B

As Example B, a modifying treatment using a gas phase reaction system was performed.

Example B1

4 mL of fluorous solvent ($CF_3(CF_2)_4CF_3$), 2 mL of water ($H_2O$), 90 mg of sodium chlorite ($NaClO_2$), and 20 μL of 35% hydrochloric acid (HCl) were placed in the same reaction vessel and stirred for 5 minutes. The reaction vessel was allowed to stand still, thereby separating into the fluorous solvent as an organic phase, an aqueous phase, and a gas phase from the bottom. Since the organic phase became yellow, it was verified that white gas was generated in the gas phase. The chlorine dioxide radicals are generated in the aqueous phase and are dissolved in the more stable organic phase (fluorous solvent). That is, the change of color of the organic phase into yellow represents the generation of a chlorine dioxide radical, and thus the generation of the chlorine dioxide radical was verified in the present example. When the dissolution into the organic phase exceeds a limit amount, the chlorine dioxide radical flows out into the gas phase as a white gas. That is, since the generation of the white gas in the gas phase represents the presence of the chlorine dioxide radical in the gas phase, it was verified that the chlorine dioxide radical was present in the gas phase in this example.

Figure 5:
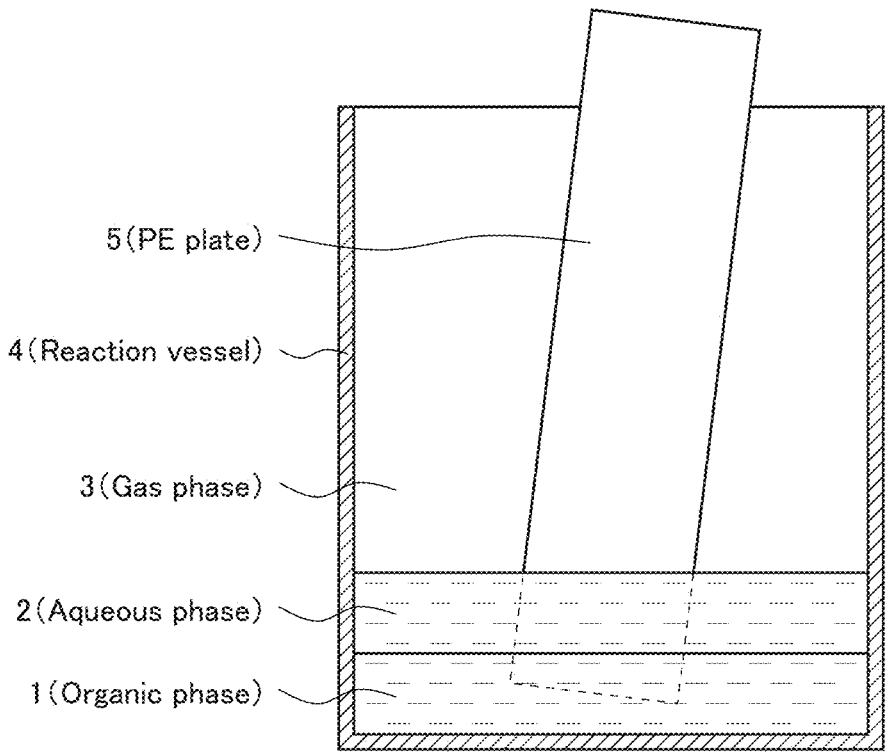
FIG. 5 is a cross-sectional view schematically showing a state of the pretreatment step in Example B1.

Next, a polyethylene plate (product No.: 2-9217-01, AS ONE Corporation) was put into the reaction vessel. The size of the polyethylene plate was 50 mm in length, 15 mm in width, and 1 mm in thickness. FIG. 5 is a schematic diagram showing a state in which the polyethylene plate is put in the reaction vessel. As shown in FIG. 5, in the reaction vessel 4, the organic phase 1, the aqueous phase 2, and the gas phase 3 were separated in this order, and the lower part of the polyethylene plate 5 was immersed in the organic phase 1, and the upper part of the polyethylene plate 5 was exposed to the gas phase 3. Then, the reaction vessel was made to be an open system without covering the upper part thereof, and was irradiated with light in the atmosphere at room temperature (about 25° C.) with a xenon lamp (500 W, manufactured by USHIO INC., attached with Pyrex® glass filter) having a wavelength of λ>290 nm without pressurizing or decompressing the inside of the reaction vessel. It was observed that, during the light irradiation, the white gas was constantly generated in the gas phase, the chlorine dioxide radical was generated in the aqueous phase, the generated chlorine dioxide radical exceeded the dissolution limit, and excessive chlorine dioxide radical flowed out into the gas phase. As to the light irradiation, the surface of the polyethylene plate exposed to the gas phase in the reaction vessel was irradiated with light. Specifically, parallel light was emitted to the surface of the polyethylene plate so as to be perpendicular to the surface from a distance of 25 cm. Then, after 30 minutes from the start of the light irradiation, the yellow coloration of the organic phase disappeared, thereby completing the reaction.

Figure 6A:
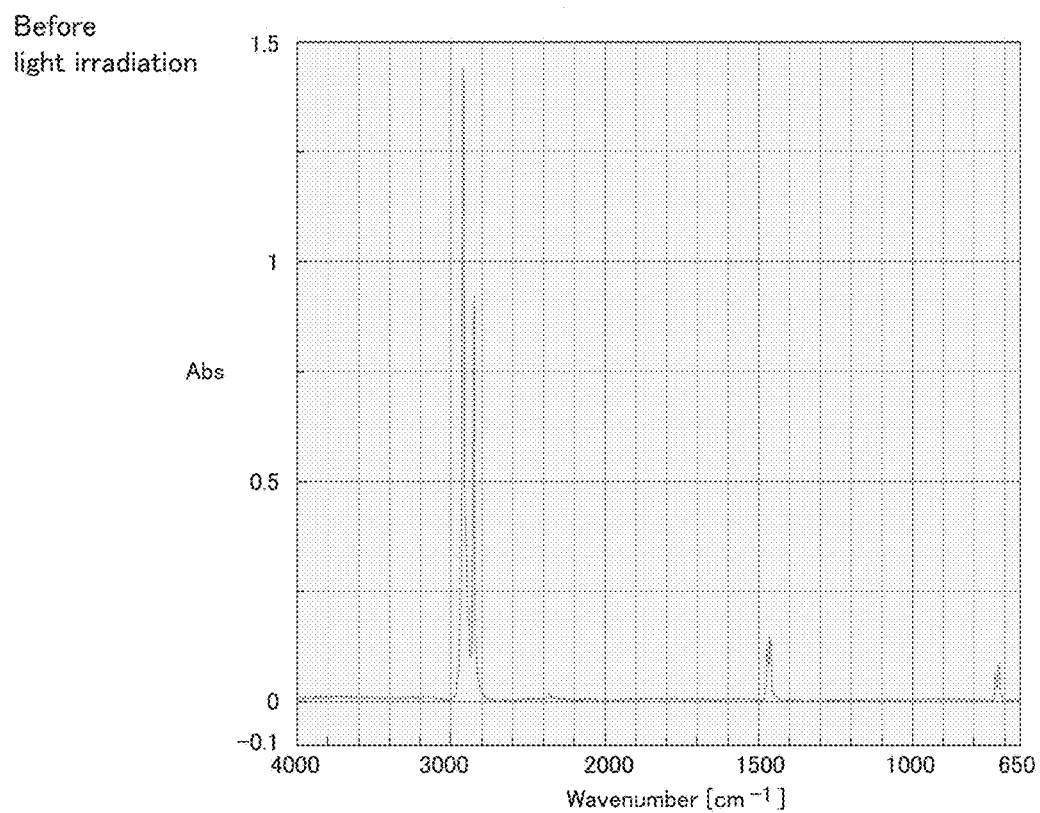
FIG. 6 shows graphs showing the results of IR of Example B1.
Figure 6B:
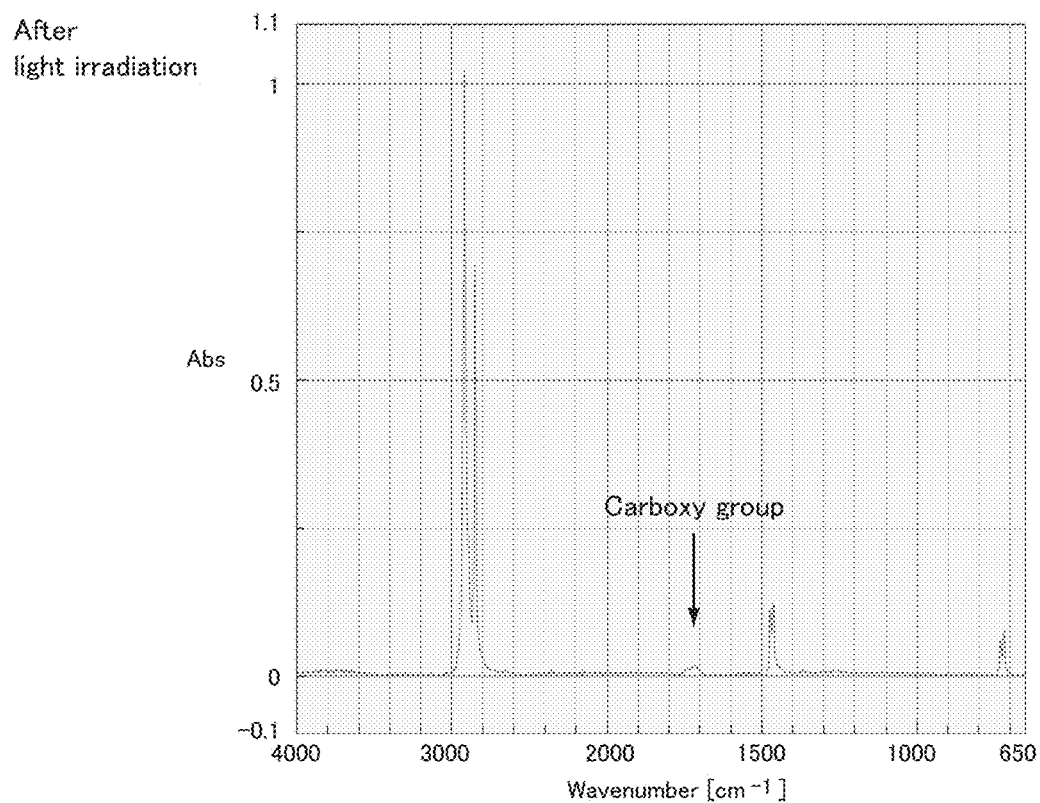

After the light irradiation, infrared spectroscopy (IR) was performed on the surface of the polyethylene plate that has been irradiated with light. As a comparative example, the polyethylene plate was subjected to IR in advance in the same manner before being irradiated with light. For IR, FT/IR-4700 (product name, manufactured by JASCO Corporation) was used. The results are shown in FIG. 6. In FIG. 6, (A) shows the result before the light irradiation, and (B) shows the result after the light irradiation.

As shown in (B) of FIG. 6, owing to the light irradiation, a peak (in the vicinity of 1700 cm$^{-1}$) showing a carboxy group (—COOH), which was not observed in (A) of FIG. 6 showing the result before the light irradiation, was observed. This result shows that, in the polyethylene plate, the C—H bond of polyethylene (in the vicinity of 2900 cm$^{-1}$) was oxidized to a carboxy group (in the vicinity of 1700 cm$^{-1}$) and the surface of the polyethylene plate was modified.

Example B2

A modifying treatment using a gas phase reaction system was performed in the same manner as in Example B1 except that polypropylene was used instead of the polyethylene.

(1) Polypropylene Film

Figure 7A:
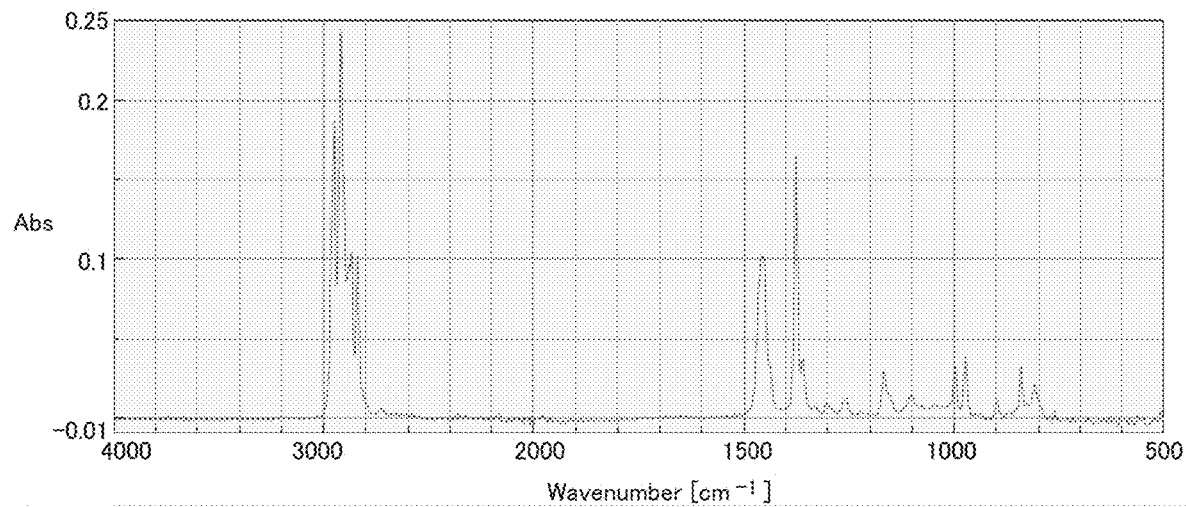
FIG. 7 shows graphs showing the results of IR of Example B2.
Figure 7B:
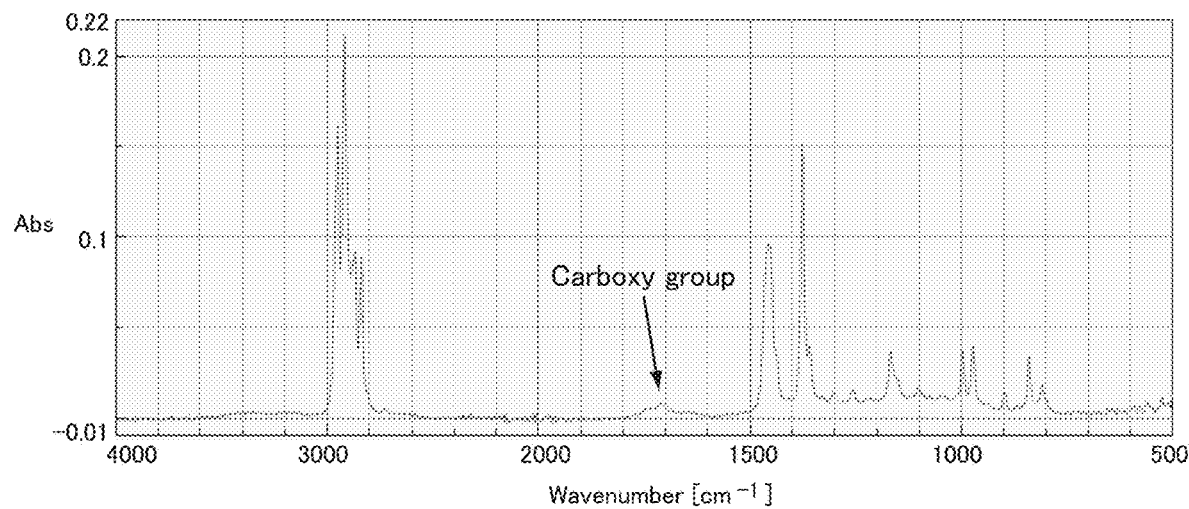

Instead of the polyethylene plate, a polypropylene film was used. The polypropylene film was formed by heat pressing 3 g of polypropylene pellet (product name: prime Polypro®, manufactured by Prime Polymer Co., Ltd.) at 160° C. and 20 MPa for 10 minutes. The polypropylene film was cut to a size having a length of 50 mm, a width of 15 mm, and a thickness of 0.3 mm. After the light irradiation, IR was performed on the surface of the polypropylene film that has been irradiated with light in the same manner as in Example B1. As a comparative example, the polypropylene film was subjected to IR in advance in the same manner before being irradiated with light. The results are shown in FIG. 7. In FIG. 7, (A) shows the result before the light irradiation, and (B) shows the result after the light irradiation.

As shown in (B) of FIG. 7, owing to the light irradiation, a peak (in the vicinity of 2900 cm$^{-1}$) showing a carboxy group (—COOH), which was not observed in (A) of FIG. 7 showing the result before the light irradiation, was observed. This result shows that, in the polypropylene film, the methyl group (—CH$_3$) of the side chain of polypropylene (in the vicinity of 2900 cm$^{-1}$) and the C—H bond contained in the main chain of polypropylene (in the vicinity of 2900 cm$^{-1}$) were oxidized to a carboxy group (—COOH) (in the vicinity of 1700 cm$^{-1}$), and the surface of the polypropylene film was modified.

Furthermore, X-ray photoelectron spectroscopy (XPS) was applied to the polypropylene film after being irradiated with the light. As a comparative example, XPS was applied to the film in advance in the same manner before being irradiated with light. The results are shown in FIG. 8. In FIG. 8, (A1) shows the result of the wide scan analysis (XPS_wide) by XPS before the light irradiation, (A2) shows the result of the narrow scan analysis of carbon 1s (XPS_C 1s) by XPS before the light irradiation, (B1) shows the result of the wide scan analysis (XPS_wide) by XPS after the light irradiation, and (B2) shows the result of the narrow scan analysis of carbon 1s (XPS_C 1s) by XPS after the light irradiation.

As shown in (B1) of FIG. 8, the increase in the ratio of peak derived from the oxygen 1s owing to the light irradiation was observed as compared to (A1) of FIG. 8 before the light irradiation. This result shows that the surface of the polypropylene film was oxidized. Further, as shown in (B2) of FIG. 8, owing to the light irradiation, a peak in the vicinity of 289 eV derived from the carboxy group (—COOH), which was not observed in (A2) of FIG. 8 showing the result before the light irradiation, was observed. This result shows that the surface of the polypropylene film was oxidized in the polypropylene film.

(2) Polypropylene Pellet

Next, the polypropylene pellet used for molding the polypropylene film was subjected to a modifying treatment in the following manner. 20 mL of a fluorous solvent (CF$_3$(CF$_2$)$_4$CF$_3$), 20 mL of water (H$_2$O), 200 mg of sodium chlorite (NaClO$_2$), and 200 µL of 35% hydrochloric acid (HCl) were placed in the same reaction vessel and stirred for 5 minutes. The reaction vessel was allowed to stand still, thereby separating into the fluorous solvent as an organic phase, an aqueous phase, and a gas phase from the bottom. Then, generation of the chlorine dioxide radical was verified by the organic phase becoming yellow.

Next, 3 g of polypropylene pellet (product name: Prime Polypro®, manufactured by Prime Polymer Co., Ltd.) was put into the reaction vessel. The shape of the polypropylene pellet was granular, and the size thereof was about 2 to 3 mm in diameter. In the reaction vessel, the polypropylene pellet was submerged in the organic phase. Then, the reaction vessel was made to be an open system without covering the upper part thereof, and was irradiated with light in the atmosphere at room temperature (about 25° C.) with a xenon lamp (500 W, manufactured by USHIO INC., attached with Pyrex® glass filter) having a wavelength of λ>290 nm while stirring with a magnetic stirrer without pressurizing or decompressing the inside of the reaction vessel. Specifically, the side surface of the reaction vessel was irradiated with light from a distance of 25 cm. Then, after 30 minutes from the start of the light irradiation, the yellow coloration of the organic phase disappeared, thereby completing the reaction. In principle, since one surface of the pellet is irradiated with light, it can be considered that 50% or more of the surface area is modified.

The modified polypropylene pellet after the modifying treatments was sufficiently dried, and then the XPS measurement was performed, thereby examining the element introduced by the modification.

The XPS measurement conditions are described again below. A commercially available device (product name: AXIS-NOVA, manufactured by KmtoS) was used under the measurement conditions as follows: monochromatization AlKa (1486.6 eV) was used as an X-ray source and an analytical area was 300 µm×700 µm (set value).

From the measurement results, the composition ratio (element %) of the elements contained in the modified propylene pellet was calculated based on a conventional method. The ratio between the Group 16 element composition ratio [Cα] and the Group 17 element composition ratio [Cβ] was [Cα]/[Cβ]=5.5/0.9=6.1.

Example B3

A modifying treatment using a gas phase reaction system was performed in the same manner as in Example B1 except that a polymethylmethacrylate (PMMA) plate was used instead of the polyethylene plate.

Figure 9A:
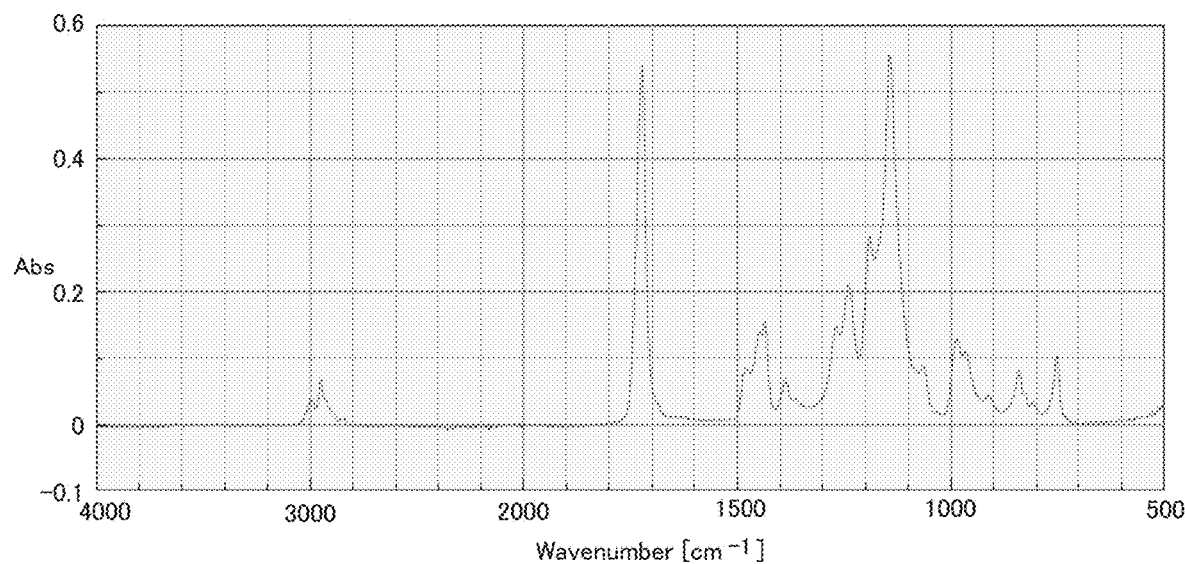
FIG. 9 shows graphs showing the results of IR of Example B3.
Figure 9B:
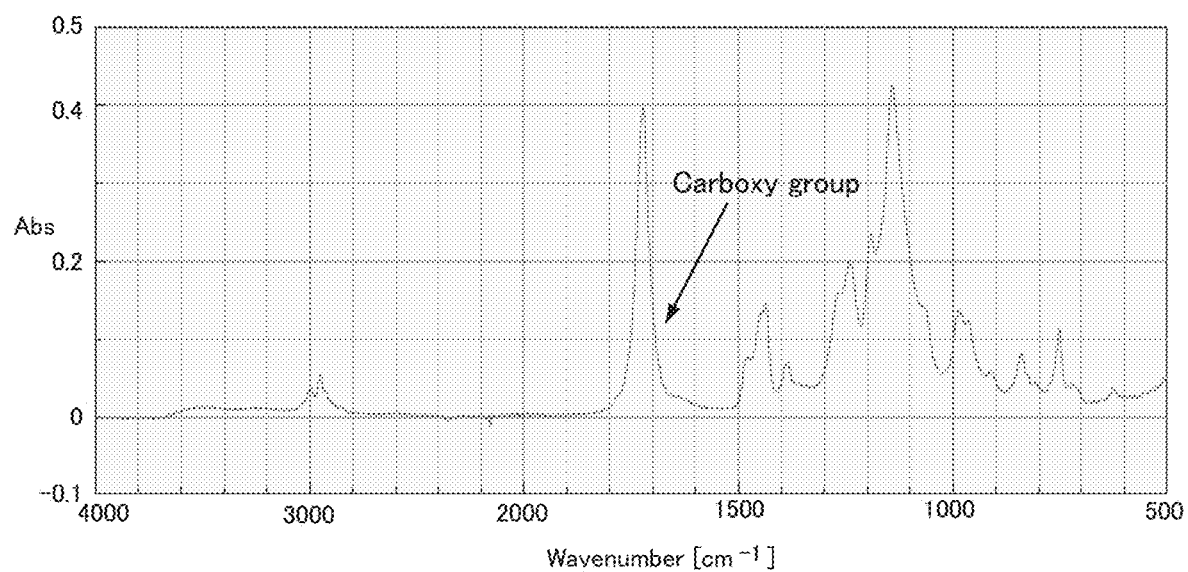

The size of the PMMA plate (product No.: 2-9208-01, AS ONE Corporation) used was 50 mm in length, 15 mm in width, and 1 mm in thickness. After the light irradiation, IR was performed on the surface of the PMMA plate that has been irradiated with light in the same manner as in Example B1. As a comparative example, the PMMA plate was subjected to IR in advance in the same manner before being irradiated with light. The results are shown in FIG. 9. In FIG. 9, (A) shows the result before the light irradiation, and (B) shows the result after the light irradiation.

As shown in FIG. 9, in (B) of FIG. 9 after the light irradiation, as shown by the arrow, the vicinity of the 1700 cm$^{-1}$ was widely raised as compared to (A) of FIG. 9 before the light irradiation, and the broadening of the shoulder peak was observed. The peak corresponds to a carbonyl group (—C(=O)—) contained in an ester group (—COOR), a carboxy group (—COOH), or the like. This result shows that, in the PMMA plate, a C—H bond contained in a methyl group (—CH$_3$) or the like of the side chain of the PMMA was oxidized to a carboxy group (—COOH), and the surface of the PMMA plate was modified.

Example B4

A modifying treatment using a gas phase reaction system was performed in the same manner as in Example B1 except that a polydimethylsiloxane (PDMS) film was used instead of the polyethylene plate.

Figure 10A:
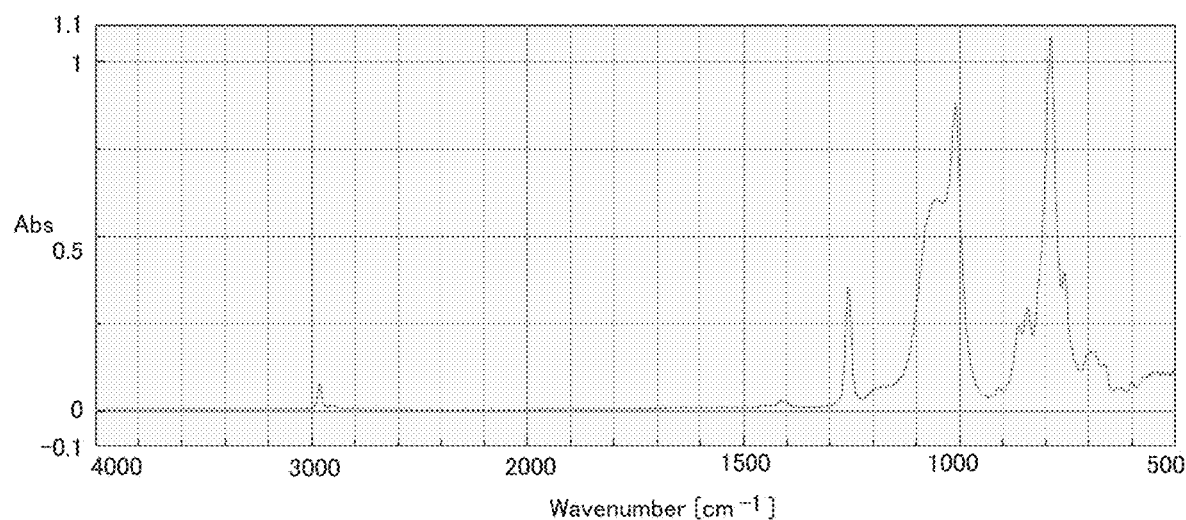
FIG. 10 shows graphs showing the results of IR of Example B4.
Figure 10B:
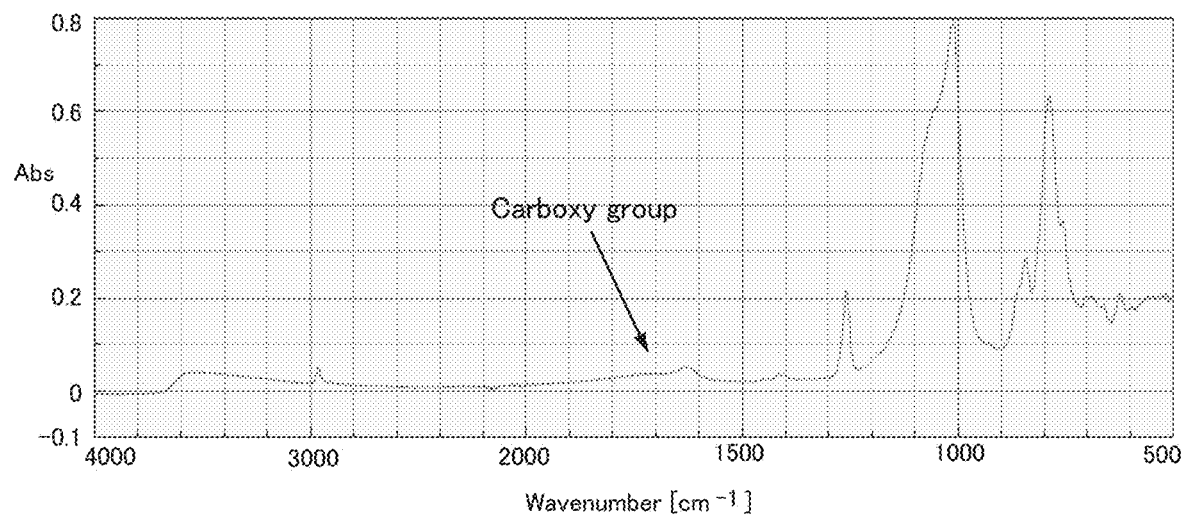

The PDMS film (product name: Sylgard 184, manufactured by Dow Corning Toray Co., Ltd.) used was 40 mm in length, 15 mm in width, and 1 mm in thickness. After the light irradiation, IR was performed on the surface of the PDMS film that has been irradiated with light in the same manner as in Example B1. As a comparative example, the PDMS film was subjected to IR in advance in the same manner before being irradiated with light. The results are shown in FIG. 10. In FIG. 10, (A) shows the result before the light irradiation, and (B) shows the result after the light irradiation.

As shown in FIG. 10, a peak in the vicinity of 1700 cm$^{-1}$ was not observed in (A) of FIG. 10 showing the result before the light irradiation, whereas a peak in the vicinity of 1700 cm$^{-1}$ was observed in (B) of FIG. 10 after the light irradiation. The peak corresponds to a carboxy group (—COOH). This result shows that, in the PDMS film, the methyl group (—CH$_3$) of the side chain of the PDMS (peak in the vicinity of 2900 cm$^{-1}$) and the C—H bond of the main chain of the PDMS (peak in the vicinity of 2900 cm$^{-1}$) were oxidized to a carboxy group (—COOH) (peak in the vicinity of 1700 cm$^{-1}$), and the surface of the PDMS film was modified.

Example B5

A modifying treatment using a gas phase reaction system was performed in the same manner as in Example B1 except that a polycarbonate (PC) plate was used instead of the polyethylene plate.

Figure 11A:
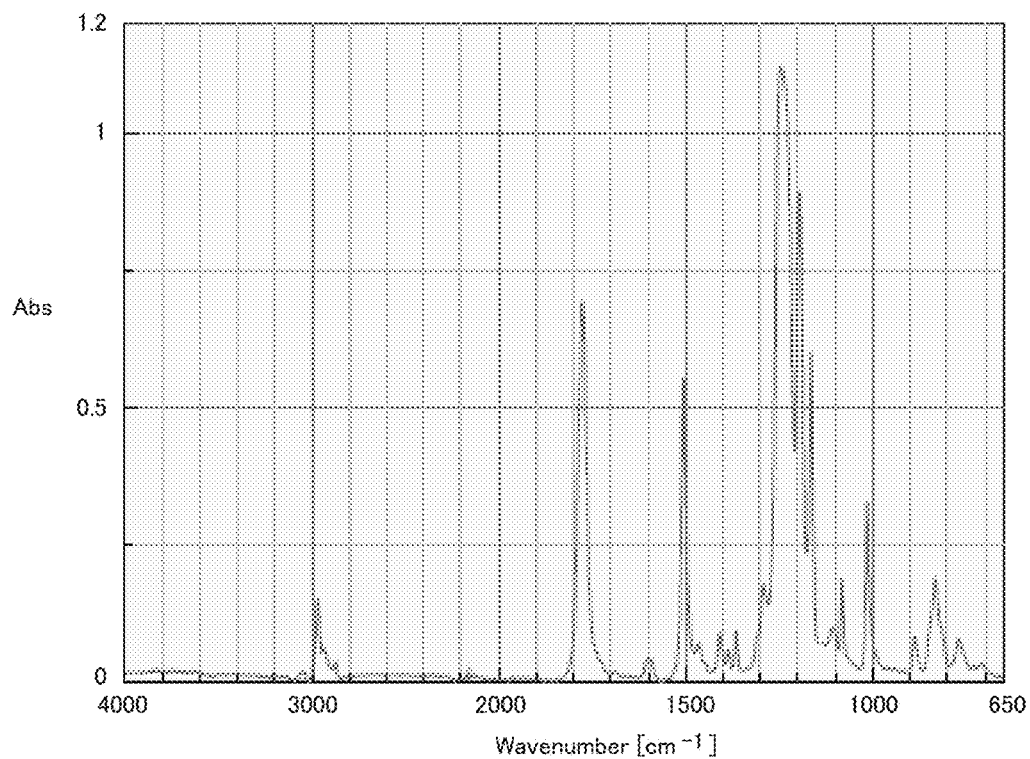
FIG. 11 shows graphs showing the results of IR of Example B5.
Figure 11B:
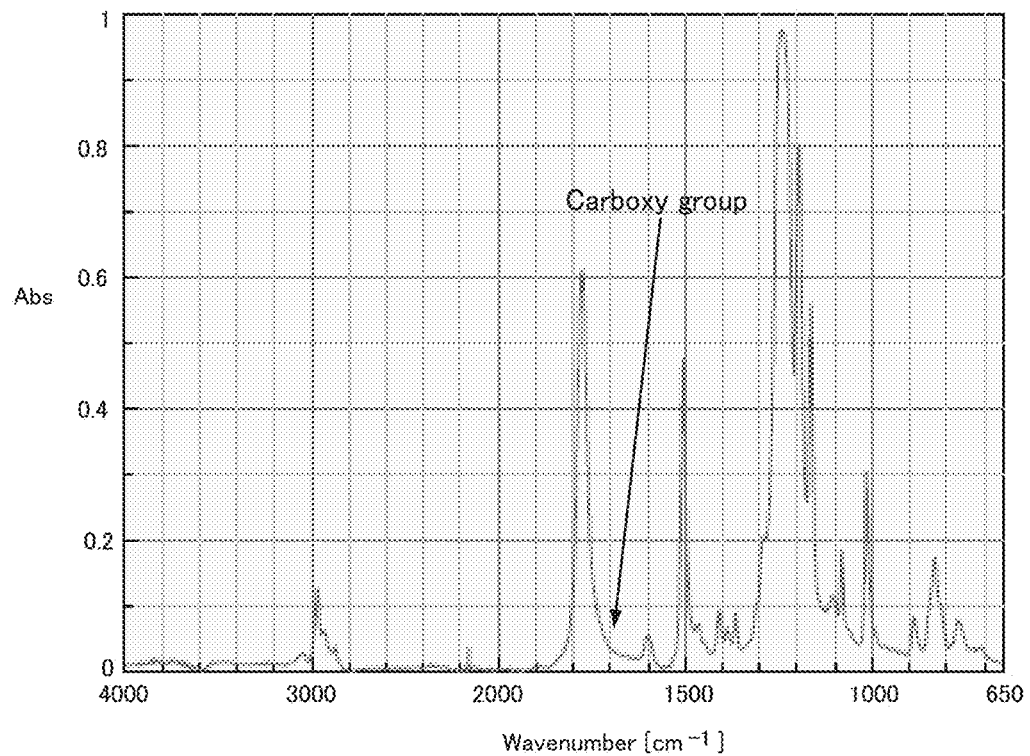

The polycarbonate (PC) plate (product No.: 2-9226-01, AS ONE Corporation) used was 50 mm in length, 15 mm in width, and 1 mm in thickness. After the light irradiation, IR was performed on the surface of the PC plate that has been irradiated with light in the same manner as in Example B1. As a comparative example, the PC plate was subjected to IR in advance in the same manner before being irradiated with light. The results are shown in FIG. 11. In FIG. 11, (A) shows the result before the light irradiation, and (B) shows the result after the light irradiation.

As shown in FIG. 11, in (B) of FIG. 11 after the light irradiation, as shown by the arrow, the vicinity of the 1700 cm$^{-1}$ was widely raised as compared to (A) of FIG. 11 before the light irradiation, and the broadening of the shoulder peaks was observed. The peak corresponds to a carbonyl group (—C(=O)—) contained in a carbonate group (—O—(C=O)—O—), a carboxy group (—COOH), or the like. This result shows that, in the PC plate, a C—H bond contained in a methyl group (—CH$_3$) or the like of the side chain of the PC was oxidized to a carboxy group (—COOH), and the surface of the PC plate was modified.

Example B6

A modifying treatment using a gas phase reaction system was performed in the same manner as in Example B1 except that a liquid crystal polymer (LCP) plate was used instead of the polyethylene plate.

Figure 12A:
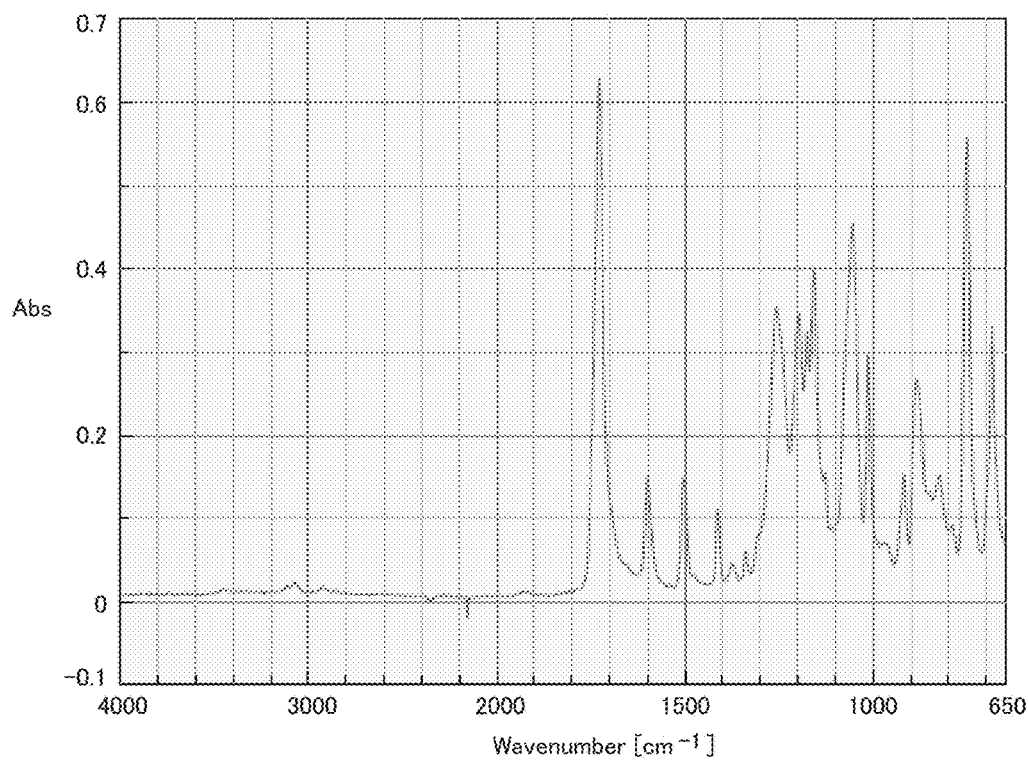
FIG. 12 shows graphs showing the results of IR of Example B6.
Figure 12B:
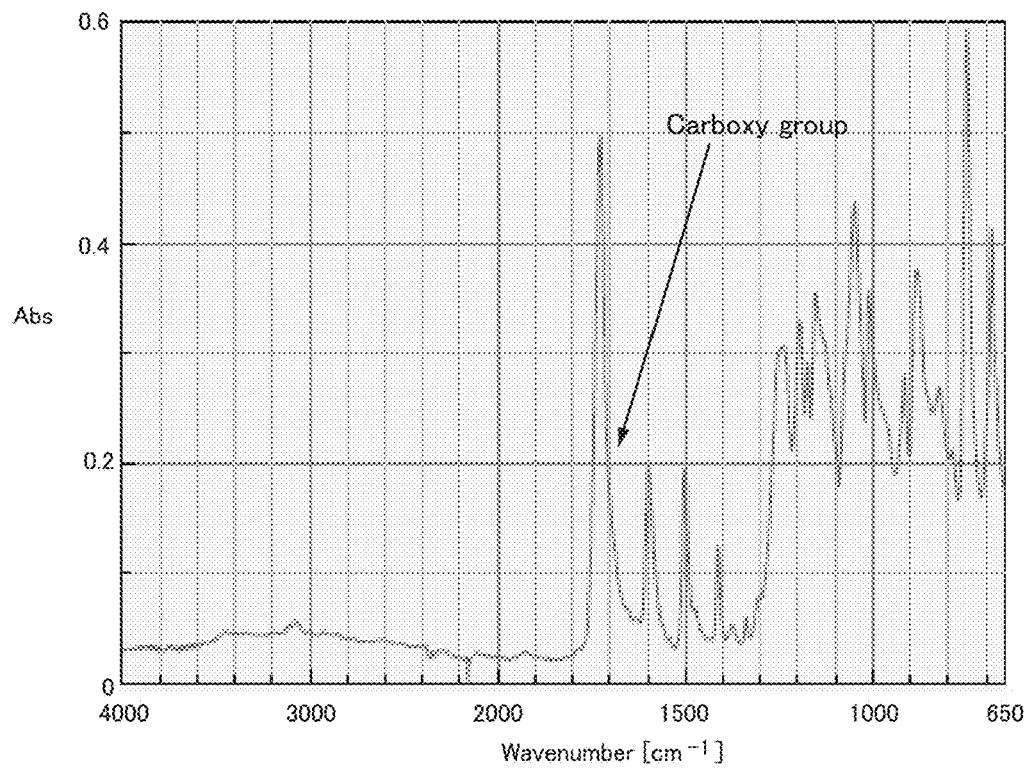

The LCP plate (product name: 6030 g-mf, manufactured by UENO FINE CHEMICALS INDUSTRY.LTD.) used was 50 mm in length, 15 mm in width, and 1 mm in thickness. After the light irradiation, IR was performed on the surface of the LCP plate that has been irradiated with light in the same manner as in Example B1. As a comparative example, the LCP plate was subjected to IR in advance in the same manner before being irradiated with light. The results are shown in FIG. 12. In FIG. 12, (A) shows the result before the light irradiation and (B) shows the result after the light irradiation.

As shown in FIG. 12, in (B) of FIG. 12 after the light irradiation, as shown by the arrow, the vicinity of the 1700 cm$^{-1}$ was widely raised as compared to (A) of FIG. 12 before the light irradiation, and the broadening of the shoulder peaks was observed. The peak corresponds to a carbonyl group (—C(=O)—) contained in an ester group (—COOR), a carboxy group (—COOH), or the like. This result shows that, in the LCP plate, a C—H bond contained in the LCP was oxidized to a carboxy group (—COOH) and the surface of the LCP plate was modified.

While the present invention has been described above with reference to illustrative embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2018-018598 filed on Feb. 5, 2018. The entire subject matter of the Japanese Patent Application is incorporated herein by reference.

INDUSTRIAL APPLICABILITY

As described above, according to the target molecule binding method of the present invention, first, in the pretreatment step, the polymer molded body can be easily selectively modified by simply irradiating the selected surface of the polymer molded body with light in the presence of the compound radical. As a result, a selected surface on the surface of the polymer molded body can be modified to have a reactivity different from that of a non-selected surface. Therefore, according to the present invention, it is possible to selectively bind the target molecule to the selected surface in the binding step by utilizing the difference in reactivity between the selected surface and the non-selected surface on the surface of the polymer molded body after the pretreatments.

REFERENCE SIGNS LIST 1 organic layer (organic phase)
2 aqueous layer (aqueous phase)
3 gas phase
4 reaction vessel
5 plate

The invention claimed is:

1. A method for selectively binding a target molecule to a polymer molded body, comprising:
 a pretreatment step of irradiating a compound radical with light in a reaction system comprising a polymer molded body and the compound radical to modify a surface of the polymer molded body; and
 a binding step of bringing a target molecule into contact with the polymer molded body after the pretreatments to bind the target molecule to a selected surface of the polymer molded body, wherein
 in the pretreatment step,
 the selected surface is modified by selectively irradiating the selected surface on the surface of the polymer molded body with light in a presence of the compound radical, or irradiating the compound radical with light while masking a surface other than the selected surface on the surface of the polymer molded body, wherein the compound radical is an oxide radical of a Group 17 element.

2. The method according to claim 1, wherein the target molecule is at least one functional molecule selected from the group consisting of coloring molecules, fluorescent molecules, biological molecules, drug molecules, catalyst molecules, coating material molecules, fragrance molecules, adsorbate molecules, metal colloid molecules, metal complex molecules, charge regulating molecules, and affinity regulating molecules.

3. The method according to claim 2, wherein the target molecule is the biological molecule, and is at least one functional molecule selected from the group consisting of antibodies, growth factors, proliferators, and adhesive factors.

4. The method according to claim 1, wherein in the binding step, the target molecule is directly bound to the selected surface after the pretreatment step.

5. The method according to claim 1, wherein in the binding step, the target molecule is bound to the selected surface after the pretreatment step through a linker molecule.

6. The method according to claim 1, wherein the compound radical is a chlorine dioxide radical.

7. The method according to claim 1, wherein in the pretreatment step, the selected surface of the polymer molded body is oxidized, and in the binding step, the target molecule is brought into contact with an oxidized site on the selected surface after the pretreatment step.

8. The method according to claim 1, wherein the polymer molded body is at least one selected from the group consisting of sheets, films, plates, tubes, pipes, rods, beads, and blocks.

9. The method according to claim 1, wherein the polymer molded body comprises a polymer having a carbon-hydrogen bond.

10. The method according to claim 1, wherein the polymer is a polyolefin.

11. A method for producing a target molecule-bound polymer molded body, comprising:
 a binding step of binding a target molecule to a polymer molded body, wherein
 a binding method in the binding step is the binding method according to claim 1.

* * * * *